(12) United States Patent
Rondinone et al.

(10) Patent No.: US 9,637,828 B2
(45) Date of Patent: May 2, 2017

(54) ELECTROCHEMICAL METHOD FOR SYNTHESIZING METAL-CONTAINING PARTICLES AND OTHER OBJECTS

(71) Applicant: UT-Battelle, LLC, Oak Ridge, TN (US)

(72) Inventors: Adam Justin Rondinone, Knoxville, TN (US); Ilia N. Ivanov, Knoxville, TN (US); Sean Campbell Smith, Oak Ridge, TN (US); Chengdu Liang, Knoxville, TN (US); Dale K. Hensley, Kingston, TN (US); Ji-Won Moon, Oak Ridge, TN (US); Tommy Joe Phelps, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 526 days.

(21) Appl. No.: 14/205,718

(22) Filed: Mar. 12, 2014

(65) Prior Publication Data

US 2014/0262810 A1 Sep. 18, 2014

Related U.S. Application Data

(60) Provisional application No. 61/777,009, filed on Mar. 12, 2013.

(51) Int. Cl.
*C25B 1/00* (2006.01)
*C25B 1/21* (2006.01)
(Continued)

(52) U.S. Cl.
CPC .................. *C25B 1/00* (2013.01); *C25B 1/21* (2013.01); *C25B 11/00* (2013.01); *B82Y 40/00* (2013.01)

(58) Field of Classification Search
CPC .. C25B 1/00; C25B 11/00; C25B 1/21; B82Y 40/00
See application file for complete search history.

(56) References Cited

U.S. PATENT DOCUMENTS 6,444,453 B1 9/2002 Lauf et al.
7,060,473 B2 6/2006 Phelps et al.
(Continued)

FOREIGN PATENT DOCUMENTS

WO    WO 2012/138480 A2    10/2012

OTHER PUBLICATIONS

Metz K.M. et al., "Nanotextured Gold Coatings on Carbon Nanofiber Scaffolds as Ultrahigh Surface-Area Electrodes", Journal of Power Sources 198:393-401(2012).
(Continued)

*Primary Examiner* — Arun S Phasge
(74) *Attorney, Agent, or Firm* — Scully Scott Murphy & Presser

(57) ABSTRACT

The invention is directed to a method for producing metal-containing (e.g., non-oxide, oxide, or elemental) nano-objects, which may be nanoparticles or nanowires, the method comprising contacting an aqueous solution comprising a metal salt and water with an electrically powered electrode to form said metal-containing nano-objects dislodged from the electrode, wherein said electrode possesses a nanotextured surface that functions to confine the particle growth process to form said metal-containing nano-objects. The invention is also directed to the resulting metal-containing compositions as well as devices in which they are incorporated.

31 Claims, 3 Drawing Sheets

(51) Int. Cl.
*C25B 11/00* (2006.01)
*B82Y 40/00* (2011.01)

(56) References Cited

U.S. PATENT DOCUMENTS

| | | | |
|---|---|---|---|
| 8,349,221 | B2 | 1/2013 | Kawamoto et al. |
| 8,759,053 | B2 | 6/2014 | Phelps et al. |
| 2005/0260453 | A1 | 11/2005 | Jiao et al. |
| 2006/0141268 | A1 | 6/2006 | Kalkan et al. |
| 2007/0279837 | A1 | 12/2007 | Chow et al. |
| 2008/0217181 | A1* | 9/2008 | Hautier .................. C25D 3/54 205/77 |
| 2010/0184179 | A1 | 7/2010 | Rondinone et al. |
| 2010/0330367 | A1 | 12/2010 | Phelps et al. |

OTHER PUBLICATIONS

International Search Report and Written Opinion dated Jul. 10, 2014 received from the International Searching Authority in related International Application No. PCT/US2014/023901.

Dameron C.T. et al., "Biosynthesis of Cadmium Sulphide Quantum Semiconductor Crystallites", Nature 338:596-597 (Apr. 13, 1989).

Smith P.R. et al., "Photophysical and Photochemical Characterisation of Bacterial Semiconductor Cadminum Sulfide Particles", J. Chem. Soc., Faraday Trans. 94(9):1235-1241 (1998).

Talam S. et al., "Synthesis, Characterization, and Spectroscopic Properties of ZnO Nanoparticles", International Scholarly Research Network, ISRN Nanotechnology 2012, Article ID 372505 (6 pages) (2012).

* cited by examiner

ELECTROCHEMICAL METHOD FOR SYNTHESIZING METAL-CONTAINING PARTICLES AND OTHER OBJECTS

The present application claims benefit of U.S. Provisional Application No. 61/777,009, filed on Mar. 12, 2013, all of the contents of which are incorporated herein by reference.

This invention was made with government support under Prime Contract No. DE-AC05-00OR22725 awarded by the U.S. Department of Energy. The government has certain rights in the invention.

FIELD OF THE INVENTION

The present invention relates to the field of inorganic particles, and more particularly, to such particles having a metal chalcogenide, metal pnictide, or metal oxide composition.

BACKGROUND OF THE INVENTION

Nanoparticles having metal-containing non-oxide compositions (i.e., "semiconductor" or "quantum dot" nanoparticles) are increasingly being used in numerous emerging applications. Some of these applications include electronics (e.g., transistors and diode lasers), LED displays, photovoltaics (e.g., solar cells), and medical imaging. Quantum dot nanoparticles are also being investigated as powerful new computer processing elements (i.e., qubits). Semiconductor nanoparticles often possess a metal chalcogenide composition, such as CdSe and ZnS.

As a consequence of its small size, the electron band structure of a quantum dot differs significantly from that of the bulk material. In particular, significantly more of the atoms in the quantum dot are on or near the surface, in contrast to the bulk material in which most of the atoms are far enough removed from the surface so that a normal band structure predominates. Thus, the electronic and optical properties of a quantum dot are related to its size. In particular, photoluminescence is size dependent.

Several physical methods are known for synthesizing semiconductor nanoparticles. Some of the physical techniques include advanced epitaxial, ion implantation, and lithographic techniques. The physical techniques are generally useful for producing minute amounts of semiconductor nanoparticles with well-defined (i.e., tailor-made, and typically, uniform) morphological, electronic, magnetic, or photonic characteristics. The physical techniques are typically not useful for synthesizing semiconductor nanoparticles in commercially significant quantities (e.g., grams or kilograms). Several chemical processes are also known for the production of semiconductor nanoparticles. Some of these methods include arrested precipitation in solution, synthesis in structured media, high temperature pyrolysis, and sonochemical methods. For example, cadmium selenide can be synthesized by arrested precipitation in solution by reacting dialkylcadmium (i.e., $R_2Cd$) and trioctylphosphine selenide (TOPSe) precursors in a solvent at elevated temperatures, i.e.,

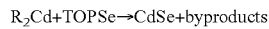

$$R_2Cd + TOPSe \rightarrow CdSe + byproducts$$

High temperature pyrolysis of semiconductor nanoparticles generally entails preparing an aerosol containing a mixture of volatile cadmium and selenium precursors, and then subjecting the aerosol to high temperatures (e.g., by carrying through a furnace) in the presence of an inert gas. Under these conditions, the precursors react to form the semiconductor nanoparticles (e.g., CdSe) and byproducts.

Although the chemical processes described above are generally capable of producing semiconductor nanoparticles in more significant quantities, the processes are generally energy intensive (e.g., by generally requiring heating and a post-annealing step), and hence, costly. Accordingly, commercially significant amounts of the resulting nanoparticles tend to be prohibitively expensive. Furthermore, these processes tend to be significantly limited with respect to control of the physical (e.g., size, shape, and crystalline form) and electronic or photonic characteristics of the resulting nanoparticles.

The microbial synthesis of semiconductor nanoparticles is known, e.g., P. R. Smith, et al., *J. Chem. Soc., Faraday Trans.*, 94(9), 1235-1241 (1998); C. T. Dameron, et al., *Nature*, 338: 596-7, (1989); and U.S. Application Pub. No. 2010/0330367. However, there are significant obstacles that prevent such microbially-mediated methods from being commercially viable. For example, current microbial methods are generally limited to the production of semiconductor nanoparticles on a research scale, i.e., an amount sufficient for elucidation by analytical methods. In addition, current microbial processes generally produce semiconductor nanoparticles adhered to cell membranes. Accordingly, numerous separation and washing steps are generally needed. Moreover, the range of particle compositions is limited by the reduction potential limitations of microbes as well as the allowable concentration limits of nutritive metal sources before reaching a level of toxicity to the microbes, i.e., "nutrient toxicity".

Similarly, particles having metal oxide compositions are increasingly being used in numerous emerging applications. Some of these include the use of magnetic nanoparticles (e.g., magnetite) in magnetic refrigeration or magnetic cooling circuits. Ferrite-type nanoparticles, in particular, are being intensely studied for their use in the fields of biomedicine, optics, and electronics. Other applications include photovoltaic materials, as used, for example, in solar cell devices.

Current methods for the production of nanoscale ferrites and other oxide ceramics generally entail calcining a precursor (e.g., a carbonate) at a high temperature, and then mechanical milling the calcined product to reduce the particle size. The process is energy and time intensive, generally difficult to control, and often requires several repetitions of the process before a final product is obtained.

Chemical processes, such as precipitation and sol-gel techniques, are also known for the production of metal oxide particles. However, these processes are typically more expensive than mechanical milling, and also generally highly limited with respect to size or shape control of the resulting particles. Often, a chemical or physical reduction step is needed to convert a metal oxide precursor to a metal oxide product. In addition, these processes often require a mechanical milling step to break up agglomerates formed during the reduction process.

The microbial synthesis of metal oxide nanoparticles is also known. See, for example, U.S. Pat. Nos. 6,444,453 and 7,060,473. However, there are significant problems in the microbial process as currently practiced. For example, there is the difficulty of obtaining pure nanoparticle product bereft of microbial matter. Therefore, numerous lysing or washing steps are often required. There is also the difficulty in controlling the particle size or the morphology of the nanoparticles, as well as limitation in microbial reduction potentials and nutrient toxicity.

SUMMARY OF THE INVENTION

The invention is foremost directed to a convenient electrochemical (abiotic) method for the production of a wide variety of metal-containing nano-objects (e.g., nanoparticles or nanowires), including metal non-oxide (e.g., metal chalcogen or pnictide) or metal oxide compositions. The method described herein can advantageously produce a wide range of metal-containing particles with many of the benefits of microbial-based methods (e.g., lower cost and bulk production), but without many of the drawbacks of microbial-based methods, such as limitations in reduction potential and metal concentration limitations.

The invention accomplishes this by employing an electrochemical process that in many ways mimics the ability of certain (fermentative) microbes to produce metal-containing particles from a metal-containing source, except that the process significantly broadens the range of possible compositions by permitting reduction potentials beyond the capabilities of microbes, and is also insensitive to precursor metal concentrations, thus providing a system better suited for bulk production. In particular embodiments, the method includes contacting an aqueous solution that contains at least a metal salt and water with an electrically powered electrode to form metal-containing nano-objects, wherein the electrode contains on its surface an array of conductive nanoscopic projections pointed outwardly from the surface. In some embodiments, the nano-objects are dislodged (i.e., spalled off) of the electrode and subsequently collected. In other embodiments, the electrically powered electrode is, or is attached to, an electrically conductive functional substrate on which the nano-objects are formed and remain attached.

The invention is also directed to the metal-containing compositions produced by the above-described method. The metal-containing particles produced herein possess any one or more of a diverse set of properties that make them useful. Some of the properties particularly considered herein include photovoltaic, photoluminescent, light-emitting, and thermoelectric properties. Such properties make these metal-containing particles useful in one or more end applications, e.g., in photovoltaic, light-emitting, and thermoelectric devices. Other applications include electrode materials, such as found in lithium ion batteries and fuel cells, as well as catalytic materials, as used in the treatment of diesel engine emissions.

In particular aspects, the metal-containing particles are useful as photoluminescent-tunable materials, which find particular use in photovoltaic devices. Other types of devices that can benefit from such tunable materials include light-emitting and laser diodes. Accordingly, the method and compositions of the invention can greatly advance several types of devices, including photovoltaic devices.

DETAILED DESCRIPTION OF THE INVENTION

Figure 1:
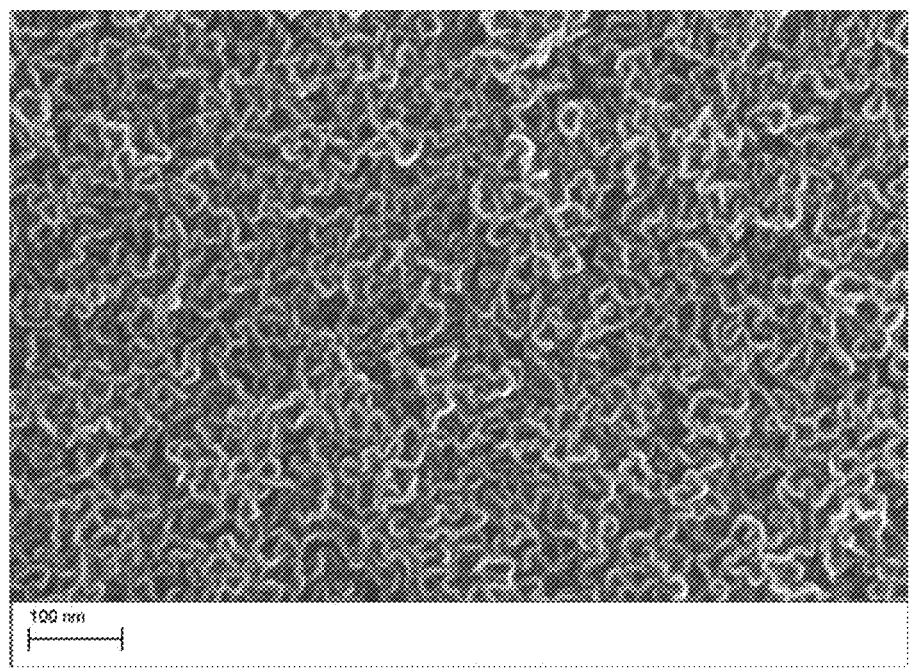
FIG. 1. A micrograph of the surface of a nanotextured electrode having graphene flakes disposed substantially vertically on the surface of a silicon underlayer.

In the process described herein, an aqueous solution containing at least a metal salt and water is contacted with an electrically powered (cathodic or anodic) electrode to form metal-containing nano-objects. In some embodiments, the nano-objects are dislodged (i.e., spalled off) of the electrode and subsequently collected. In other embodiments, the electrically powered electrode is, or is attached to, an electrically conductive functional substrate on which the nano-objects are formed and remain attached. As further described below, the metal-containing solution may or may not further include a particle growth modifier or facilitator, such as a surfactant, chelator, buffer, acid, or base, any one of which may or may not also be a surface-active agent, i.e., may or may not form coordinate bonds to surfaces of the metal-containing nano-objects during particle growth.

The term "nano-objects", as used herein, are objects having at least one, or two or all of their dimensions in the nanoscale, i.e., less than 1 micron (1 μm). In different embodiments, the nano-objects can have a size (in at least one, two, or all of the dimensions) of precisely, about, at least, above, up to, or less than, for example, 1 nm, 2 nm, 3 nm, 4 nm, 5 nm, 10 nm, 12 nm, 15 nm, 20 nm, 25 nm, 30 nm, 40 nm, 50 nm, 100 nm, 150 nm, 200 nm, 250 nm, 300 nm, 400 nm, 500 nm, 600 nm, 700 nm, 800 nm, 900 nm, or 1 μm, or any range therebetween (e.g., 1-10 nm, 2-10 nm, 1-20 nm, 2-20 nm, 3-20 nm, 1-500 nm, 5-500 nm, 1-150 nm, or 5-150 nm). In one embodiment, the nano-objects are fairly disperse in size (e.g., having a size variation of 20%, 30%, 40%, 50%, or greater from a median or mean size). In another embodiment, the nano-objects are fairly monodisperse in size (e.g., having a size variation of or less than 50%, 40%, 30%, 20%, 10%, 5%, 2%, or 1% from a median or mean size). In the specific case of symmetric particles (e.g., spherical, spheroidal, or polyhedral shapes), the particle size corresponds to the diameter of the particles.

The metal-containing objects can also have any suitable morphology. Some examples of possible shapes include amorphous, fibrous, tubular, cylindrical, rod, needle, spherical, ovoidal, pyramidal, cuboidal, rectangular, dodecahedral, octahedral, plate, and tetrahedral. In some embodiments, the metal-containing particles are equiaxed euhedral crystals (i.e., typically cubes, octahedra, and modifications thereof).

In particular embodiments, the nano-objects are nanowires. The nanowires can, in some instances, be constructed of nanoparticles connected in a linear manner (i.e., as in a string of beads), wherein the nanowire may be straight or curved. The nanowires possess two dimensions in the nanoscale with the remaining dimension set in at least the microscale (e.g., at least 1 micron and up to 100 microns) or in the macroscale (e.g., over 100 microns, and up to 500 microns, 1 mm, 2 mm, or 5 mm).

The electrically powered electrode on which the nano-objects form possesses a nanotextured surface. The nanotextured surface functions to confine (i.e., dimensionally restrict) the particle growth process at the electrode surface. The nanotextured surface achieves this by possessing a network of nanoscale or microscale features, typically ridges or edges, on which the non-oxide or oxide particles preferentially nucleate and grow. In some embodiments, the electrode surface, besides being nanotextured, is designed to permit at least a portion or substantially (or completely) all of the grown nano-objects to dislodge (i.e., spall off) from the electrode at some point during growth. Typically, the presence of edges, ridges, or projections in the nanotextured surface provides this effect; however, dislodging may also be encouraged or completely provided by including a spalling promoter, such as a surfactant. In other embodiments, particularly where the nano-objects are desired to coat a functional electrically conductive substrate, the electrically conductive substrate may function as the electrode or be attached to the electrode in order for particles to form and deposit on the substrate. In the latter embodiment, the nano-objects preferably remain affixed to the substrate. To ensure that the nano-objects remain attached to the substrate, a post-processing step, such as a drying, annealing, sealing, and/or overcoating step, may also be employed.

In some embodiments, the nanotextured electrode contains on its surface an array of conductive nanoscopic projections (i.e., points or vertices) pointed outwardly from its surface. In particular embodiments, the nanoscopic projections are formed of a conductive elemental carbon, such as graphene flakes, carbon nanofibers (e.g., carbon nanotubes), or carbon or diamond nanoparticles or nanowires. In other embodiments, the nanoscopic projections are formed of one or more conductive metals, such as copper, gold, palladium, or platinum. Such nanotextured electrodes can be made by methods known in the art, such as by vapor deposition (e.g., plasma-assisted vapor deposition), by lithographic techniques, or by known deposition (e.g., metal plating) techniques in which a texturizing agent (e.g., carbon, metal, or polymer nanoparticles) is incorporated during the deposition process. Some representative described methods that could be used for producing such nanotextured electrodes can be found in, for example, U.S. Pat. Nos. 7,226,663, 7,776,425, and 7,466,533; U.S. Application Pub. Nos. 2012/0301781 and 2011/0244692; K. M. Metz, et al., *Journal of Power Sources*, vol. 198, pp. 393-401 (January 2012); X. Sun, et al., *Russian Journal of Electrochemistry*, vol. 48, issue 11, pp. 1135-1139 (November 2012); B. Filanovsky, et al., *Nano. Lett.*, 11(4), pp. 1727-1732 (2011); N. Yang et al., *Diamond and Related Materials*, 18, no. 2-3, pp. 592-595 (2009); D. J. Kang, et al., *Nanoscale*, 5(5), pp. 1858-1863 (2013); and F. Beguin, *J. Braz. Chem. Soc.*, vol. 17, no. 6 (2006), the contents of which are herein incorporated by reference in their entirety.

The metal salt in the aqueous solution can be any one or more metal-containing compounds or materials that are soluble in the aqueous solution and which contain the metal in a cationic (i.e., non-elemental) state. A portion or all of the cationic metal species of the metal salt may be reducible or non-reducible (or oxidizable or non-oxidizable) by the electrically powered electrode under the conditions of the electrochemical process. Some examples of metal salts applicable herein include the metal halides (e.g., $CuCl_2$, $CdCl_2$, $ZnCl_2$, $ZnBr_2$, $GaCl_3$, $InCl_3$, $FeCl_2$, $FeCl_3$, $SnCl_2$, and $SnCl_4$), metal nitrates (e.g., $Cd(NO_3)_2$, $Ga(NO_3)_3$, $In(NO_3)_3$, and $Fe(NO_3)_3$), metal perchlorates, metal carbonates (e.g., $CdCO_3$), metal sulfates (e.g., $CdSO_4$, $FeSO_4$, and $ZnSO_4$), metal oxides (e.g., $Fe_2O_3$, CdO, $Ga_2O_3$, $In_2O_3$, ZnO, SnO, $SnO_2$), metal hydroxides (e.g., $Fe(OH)_3$ and $Zn(OH)_2$), metal oxyhydroxides (e.g., FeOOH, or FeO(OH), and their alternate forms), metal-EDTA complexes, metal amines (e.g., metal alkylamine, piperidine, pyridine, or bipyridine salt complexes), metal carboxylates (e.g., cadmium acetate), and metal acetylacetonate (i.e., metal-acac) complexes. For producing metal oxide particles, in particular, the metal salt can be a colloidal hydrous metal oxide or mixed metal oxide.

The aqueous solution in which the electrically powered electrode is immersed may or may not include one or more water-miscible solvents. Some examples of water-miscible solvents include the alcohols (e.g., methanol, ethanol, and isopropanol), diols (e.g., ethylene glycol), acetone, and acetonitrile.

The aqueous solution may or may not also include one or more surfactants. The one or more surfactants (the surfactant component) used in the method are any compounds or materials that have an ability to associate with the surface of a metal-containing particle (i.e. are surface active), most notably the amphiphilic class of surfactants, which include charged amphiphilic surfactants (e.g., ammonium, carboxylated, sulfonated, and zwitterionic long chain hydrocarbons) and neutral amphiphilic surfactants (e.g., hydroxylated, amidated, and/or polyethyleneoxylated (PEGylated) hydrocarbons, and siloxanes). The surfactants are preferably water-soluble, either by being naturally water-soluble, or alternatively, by being rendered substantially water-soluble by the inclusion of one or more solubilizers (e.g., an alcohol) in the aqueous solution. The surfactants may also be partially soluble or substantially insoluble in water. If so, measures are taken to ensure that the surfactants contact the particles (e.g., by means of agitation or a transfer agent).

Many of the surfactants contain a hydrocarbon moiety and a functionalized (i.e., non-hydrocarbon) moiety. Unless otherwise specified, the hydrocarbon moiety can represent a saturated or unsaturated, and straight-chained, branched, or cyclic hydrocarbon group containing at least one carbon atom. In different embodiments, the hydrocarbon moiety can preferably possess, for example, one, two, three, four, five, six, seven, or eight carbon atoms, or a minimum number of carbon atoms corresponding to any one of the foregoing examples of carbon atoms, or a range of carbon atoms resulting from any two of the foregoing examples of carbon atoms.

The surfactants typically associate with the particle surface by forming an interface between the particle surface and the aqueous solution. In order to function as a surfactant, the surfactant is used in a concentration high enough for surfactant molecules to associate with surfaces of the particles to an extent that precipitation of the particles is facilitated. Such a surfactant concentration is herein also referred to as an "effective concentration" of surfactant. Preferably, an effective concentration of surfactant is one that also permits size control or shape control of the particles during growth of the particles. Generally, the surfactant concentration is at least 100 mg/L (i.e., 0.01 wt % or 100 ppm). In different embodiments, the surfactant concentration can preferably be at, greater than, or less than 100, 200, 300, 400, 500, 600, 700, 800, 900, or 1,000 mg/L, or a range of concentrations resulting from any two of the foregoing exemplary values.

In a first embodiment, the surfactant component includes one or more organosiloxane (i.e., organosilicone) molecules and/or polymers. The organosiloxane molecule or polymer contains a hydrocarbon moiety and at least one Si—OH or Si—OR moiety, wherein the R group and hydrocarbon moiety independently represent any of the types of hydrocarbon moieties described above.

The organosiloxane can be, for example, a monosiloxane (i.e., contains one Si atom). The monosiloxane can, in turn, be a monoalkoxysilane, dialkoxysilane, or trialkoxysilane. Some examples of monoalkoxysilanes include trimethylmethoxysilane, trimethylethoxysilane, triethylmethoxysilane, tri-(n-propyl)methoxysilane, tri-(n-butyl)methoxysilane, tri-(isobutyl)methoxysilane, tri-(n-pentyl)methoxysilane, tri-(n-hexyl)methoxysilane, dimethylethylmethoxysilane, n-propyldimethylmethoxysilane, and vinyldimethylmethoxysilane. Some examples of dialkoxysilanes include dimethyldimethoxysilane, dimethyldiethoxysilane, diethyldimethoxysilane, di-(n-propyl)dimethoxysilane, di-(n-butyl)dimethoxysilane, di-(isobutyl)dimethoxysilane, di-(n-pentyl)dimethoxysilane, di-(n-hexyDdimethoxysilane, methylethyldimethoxysilane, and n-propylmethyldimethoxysilane). Some examples of trialkoxysilanes include methyltrimethoxysilane, methyltriethoxysilane, ethyltrimethoxysilane, n-propyltrimethoxysilane, n-butyltrimethoxysilane, isobutyltrimethoxysilane, n-pentyltrimethoxysilane, isopentyltrimethoxysilane, n-hexyltrimethoxysilane, n-heptyltrimethoxysilane, n-octyltrimethoxysilane, n-nonyltrimethoxysilane, n-decyltrimethoxysilane, 2-hydroxyethyltrimethoxysilane, and 3-hydroxypropyltrimethoxysilane. The corresponding monohydroxysilanes, dihydroxysilanes, or trihydroxysilanes (i.e., wherein the alkoxy group is substituted by a hydroxy group) are also considered herein as suitable examples.

The organosiloxane can also be, for example, a disiloxane (i.e., contains two Si atoms). Some examples of suitable disiloxane molecules include hexamethyldisiloxane, hexaethyldisiloxane, and hexaphenyldisiloxane. The disiloxane may also be incompletely substituted with hydrocarbon groups such that silylhydride (Si—H) groups are present. Some examples of such disiloxane molecules include pentamethyldisiloxane, 1,1,3,3-tetramethyldisiloxane, and 1,1,3,3-tetraethyldisiloxane. Disiloxane groups in which the hydrocarbon groups are replaced by alkoxy or hydroxy groups are also considered herein.

The organosiloxane can also be, for example, a trisiloxane (i.e., contains three Si atoms). Some examples of suitable trisiloxane molecules include octamethyltrisiloxane, octaethyltrisiloxane, and 1,1,1,5,5,5-hexamethyl-3,3-diphenyltrisiloxane. The trisiloxane may also be incompletely substituted with hydrocarbon groups such that silylhydride groups are present. Some examples of such trisiloxane molecules include heptamethyltrisiloxane (commercially available, e.g., Drift® Snowmaking Additive, Aquatrols, 1273 Imperial Way, Paulsboro, N.J. 08066), 1,1,1,5,5,5-hexamethyltrisiloxane, and 1,1,3,3,5,5-hexamethyltrisiloxane. Trisiloxane groups in which the hydrocarbon groups are replaced by alkoxy or hydroxy groups are also considered herein.

Other suitable organosiloxane molecules include, for example, the tetrasiloxanes, pentasiloxanes, hexasiloxanes, polysiloxanes, cyclotrisiloxanes, cyclotetrasiloxanes, cyclopentasiloxanes, cyclohexasiloxanes, silsesquioxanes, and their silylhydride-, alkoxy-, and hydroxy-containing forms. The organosiloxanes may also be substituted with any suitable functional groups, e.g., one or more epoxy, glycidyl, ethyleneoxide, di(ethyleneoxide), poly(ethyleneoxide), amide, keto, ether, fluoro, chloro, or carboxylic acid groups.

In a second embodiment, the surfactant component includes one or more ammonium salt molecules and/or polymers. The ammonium molecule or polymer contains a hydrocarbon moiety as described above and at least one positively charged amino group (e.g., at least one $NR_4^+$ group in the case of a quaternary ammonium group, wherein the four R groups are each independently a hydrocarbon moiety as described above). Preferably, the hydrocarbon moiety is composed only of carbon and hydrogen, and optionally, fluorine atoms. Fluorine atoms, if present, may substitute a portion of or all of the hydrogen atoms of the hydrocarbon moiety. The counteranion of the ammonium salt is not particularly limited, and can be, for example, a halide, nitrate, sulfate, triflate, oxalate, carbonate, bicarbonate, or acetate. Some examples of suitable ammonium groups include trimethylammonium, tetramethylammonium, tetraethylammonium, tetrapropylammonium, tetrabutylammonium, dimethyldibutylammonium, tetraphenylammonium, trimethylbenzylammonium, n-butyltrimethylammonium, n-pentyltrimethylammonium, n-hexyltrimethylammonium, n-heptyltrimethylammonium, n-octyltrimethylammonium, n-nonyltrimethylammonium, and n-decyltrimethylammonium. Other ammonium groups include ring ammonium groups (e.g., pyridinium, piperidinium, pyrazinium, piperazinium, and imidazolium), wherein the ring can be substituted by one or more hydrocarbon groups. A particular ammonium-containing surfactant suitable for use herein is a mixture of one or more quaternary ammonium compounds with one or more tertiary amines. An example of such a mixture can be found under the trade name Armoclear® 2550, supplied by Akzo Nobel Surface Chemistry, Stenungsund, Sweden.

In a third embodiment, the surfactant component includes one or more carboxylic acid molecules and/or polymers. The carboxylic acid molecule or polymer contains a hydrocarbon moiety (as described above) and at least one carboxylic acid group. Preferably, the hydrocarbon moiety is composed only of carbon and hydrogen, and optionally, fluorine atoms. Fluorine atoms, if present, may substitute a portion or all of the hydrogen atoms of the hydrocarbon moiety. As used herein, "carboxylic acid" also includes the corresponding carboxylic acid salt (i.e., "carboxylate"), and vice-versa. The carboxylate can include any suitable counteranion, as described above. The carboxylic acid molecule can be, for example, a monocarboxylic acid, dicarboxylic acid, or tricarboxylic acid. Some examples of suitable carboxylic acid molecules include acetate, propionate, butyrate, valerate (pentanoate), hexanoate, heptanoate, octanoate, decanoate, undecanoate, laurate, myristate, palmitate, benzoate, oxalate, malonate, fumarate, maleate, succinate, glutarate, phthalate, citrate, and trifluoroacetate. In one embodiment, as exemplified above, the hydrocarbon moiety of the carboxylic acid molecule is unsubstituted, i.e., contains only carbon and hydrogen. In another embodiment, the hydrocarbon moiety is substituted with one or more ether, amido, keto, amino (primary, secondary, or tertiary), fluoro, or chloro groups. Some examples of amino-substituted carboxylic acid molecules include glycine, alanine, 3-aminopropanoic acid, 4-aminobutyric acid, 6-aminohexanoic acid, 11-aminoundecanoic acid, and p-aminobenzoic acid.

In a fourth embodiment, the surfactant component includes one or more alcohol molecules and/or polymers. The alcohol molecule or polymer contains a hydrocarbon moiety (as described above) and at least one alcohol (OH) group. Preferably, the hydrocarbon moiety is composed only of carbon and hydrogen, and optionally, fluorine atoms. Fluorine atoms, if present, may substitute a portion or all of the hydrogen atoms of the hydrocarbon moiety. The alcohol can be, for example, a mono-alcohol, diol, triol, or polyol. Some examples of suitable alcohols include methanol, ethanol, n-propanol, isopropanol, n-butanol, isobutanol, t-butanol, sec-butanol, n-pentanol (amyl alcohol), isopentanol (isoamyl alcohol), neopentanol, n-hexanol, phenol, benzyl alcohol, ethylene glycol, propylene glycol, 1,3-propanediol, 1,4-butanediol, 2,3-butanediol, 1,5-pentanediol, trifluoromethanol, 4-fluorophenol, pentafluorophenol, and polyvinylalcohol (PVA). Preferably, the alcohol contains at least four, five, or six carbon atoms. The alcohol is preferably straight-chained.

In a fifth embodiment, the surfactant component includes one or more metal diketones. The metal portion of the metal diketone can be any charged metal ion capable of forming a complex with a diketone molecule. Preferably, the metal is a transition metal, and more preferably, a first-row transition metal. Even more preferably, the metal is Fe(III), which corresponds to the class of iron (III) diketones. The diketone portion can be any diketone molecule capable of forming a complex with a metal ion. Preferably, the diketone is in the form of a diketonate, which refers to a negatively charged diketone molecule wherein a proton has been removed (i.e., conjugate base of the diketone). Some examples of diketone molecules include 2,3-butanedione, 2,4-pentanedione (acetylacetone), and 2,5-hexanedione. Of particular focus herein are the metal acetylacetonates (i.e., "metal acac" or "metal ACAC" complexes). Some examples of metal acac complexes include V(III)(acac)$_3$, V(IV)(O)(acac)$_2$, Cr(III)(acac)$_3$, Mn(III)(acac)$_3$, Fe(III)(acac)$_3$, Co(II)(acac)$_2$, Ni(II)(acac)$_2$, Cu(II)(acac)$_2$, Zn(II)(acac)$_2$, Ru(III)(acac)$_3$, Pd(II)(acac)$_2$, Cd(II)(acac)$_2$, and Al(III)(acac)$_3$. In a preferred embodiment, the metal diketonate is Fe(III)(acac)$_3$.

In a sixth embodiment, the surfactant component includes one or more fluorohydrocarbon compounds or polymers. The fluorohydrocarbon compounds can be saturated or unsaturated, and straight-chained, branched, or cyclic. Preferably, the fluorohydrocarbon compounds contain at least four, five, six, seven, or eight carbon atoms. In one embodiment, the fluorohydrocarbon compounds are completely substituted with fluoro groups such that the compounds are composed of only carbon and fluorine atoms (i.e., the "perfluoro" compounds). In another embodiment, the fluorohydrocarbon compounds are incompletely substituted with fluoro groups such that the compounds are composed of carbon, hydrogen, and fluorine atoms. Some examples of suitable fluorohydrocarbon compounds include perfluoropentane, perfluorohexane, perfluoroheptane, perfluorooctane, perfluorodecalin, perfluoromethylcyclobutane (empirical formula $C_5F_{10}$), perfluorodimethylcyclobutane (empirical formula $C_6F_{12}$), perfluoromethylcyclopentane, (trifluoromethyl)cyclopentane, bis-1,3-(trifluoromethyl)cyclopentane, perfluorodimethylcyclopentane (1,2- or 1,3-dimethyl isomers, or a mixture thereof), perfluoromethylcyclohexane, perfluorodimethylcyclohexane (1,2-, 1,3-, or 1,4-dimethyl isomers, or a mixture thereof), bis-1,4-(trifluoromethyl)cyclohexane, perfluoroethylcyclohexane, perfluoroisopropylcyclohexane, perfluorotrimethylcyclohexane, perfluorocycloheptane, perfluorocyclooctane, octafluoronaphthalene, perfluorotoluene, and perfluoroxylenes.

In a seventh embodiment, the surfactant component includes one or more bacterial proteins. Some particular bacterial proteins considered herein are ice-nucleating proteins derived from *Pseudomonas syringae*. These proteins are commercially available, e.g., under the trade name Snomax®.

The aqueous solution may also include a buffer, wherein the buffer may or may not also function as a surfactant. The buffer can be any of the buffers known in the art, such as a citrate, acetate, phosphate, or borate buffer or buffering system. Some specific buffers include monopotassium phosphate, dipotassium phosphate, 4-2-hydroxyethyl-1-piperazineethanesulfonic acid (HEPES), tris(hydroxymethyl)methylamine (Tris), 3-(N-morpholino)propanesulfonic acid (MOPS), piperazine-N,N'-bis(2-ethanesulfonic acid) (PIPES), 2-(N-morpholino)ethanesulfonic acid (MES), and 2-{[tris(hydroxymethyl)methyl]-amino}ethanesulfonic acid (TES).

In some embodiments, any one or more of the classes or specific types of surfactants or buffers described above are excluded from the aqueous solution. Moreover, in some embodiments, the surfactant or buffer may function as a surface-active agent, metal bonding agent, or chelator, whereas in other embodiments, the surfactant or buffer does not function as a surface-active agent, metal bonding agent, or chelator.

In some embodiments, a ligand or chelating agent is included in the aqueous solution. In some cases, the ligand or chelating agent is selected from any of the surfactants or buffers described above that have an ability to chelate charged metal atoms, particularly the diketonates and carboxylates described above. Some examples of other ligands or chelating agents include the diamines (e.g., EDTA), triamines, tetramines, imines, diimines, salicylimines (e.g., salen), aniline, saturated and unsaturated (or aromatic) heterocyclic rings (e.g., pyridine, bipyridine, piperidine, piperazine, and thiazole), phenolates, and thiophenolates.

The aqueous solution may or may not also include an acid or base to suitably adjust or maintain the pH during the electrochemical process. The acid can be a weak acid, such as an organic acid, such as acetic acid, propionic acid, or phosphoric acid. Alternatively, the acid can be a strong acid, such as a mineral acid, such as hydrochloric acid, hydrobromic acid, hydroiodic acid, sulfuric acid, or a superacid, such as triflic acid. Some examples of bases include the metal hydroxides (e.g., hydroxides of lithium, sodium, potassium, magnesium, and calcium), metal alkoxides (e.g., lithium methoxide), metal carbonates (e.g., sodium carbonate), ammonia, and organoamines (e.g., methylamine, dimethylamine, ethylamine, triethylamine, diisopropylamine, aniline, and pyridine). The pH of the aqueous solution, as adjusted by the pH controlling agent, can be, for example, 1, 2, 3, 4, 5, 6, 7, 8, 9, 10, 11, or 12, or within a range bounded by any two of the foregoing pH values. Depending on the type of acid or base and other conditions, the molar concentration of acid or base (per total volume of precursor composition) in the aqueous solution can be at least, above, up to, or less than, for example, 0.5 molar (i.e., 0.5 M), 0.6 M, 0.7 M, 0.8 M, 1.0 M, 1.2 M, 1.5 M, 1.8 M, 2.0 M, 2.5 M, 3.0 M, 3.5 M, 4.0 M, 4.5 M, 5.0M, or an acid or base concentration within a range bounded by any two of the foregoing values. The molar concentration values given may also be referred to in terms of molar equivalents of H$^+$, or pH, wherein the pH for a strong acid generally abides by the formula pH=-log [H$^+$], wherein [H$^+$] represents the concentration of H$^+$ ions.

The produced particles can have any composition that can be made by electrochemical methods. In the case of non-oxide metal-containing particles, these contain at least one chalcophile metal and at least one non-oxide main group element, typically at least one chalcogen element in a negative oxidation state, i.e., sulfur (S), selenium (Se), and tellurium (Te), and/or at least one pnictogen element in a negative oxidation state, i.e., nitrogen (N), phosphorus (P), arsenic (As), and bismuth (Bi). The chalcophile metal is one, as known in the art, which has a propensity for forming metal-chalcogenide (i.e., metal-sulfide, metal-selenide, and metal-telluride) compositions. Some examples of chalcophile metals include, for example, Sc, Ti, V, Cr, Mn, Fe, Co, Ni, Cu, Zn, Y, Zr, Nb, Hf, Ta, Cd, Mo, W, Ag, Pd, Pt, Ga, In, Tl, Ge, Sn, Pb, Sb, and Bi. Some metals particularly considered herein include Cd, Cu, Fe, Ga, In, Sn, and Zn.

In some embodiments, the non-oxide particles have a mono-metal or mixed-metal chalcogenide or pnictide composition of the general formula:

(1)

In Formula (1) above, each of M' and M'' represents at least one metal cation, at least one of which is a transition metal cation, wherein M' and M" are the same or different, X represents S, Se, Te, N, P, As, Sb, or Bi, or a combination thereof, and the subscripts w, v, x, s, r, m, and z are integer or fractional numbers that together maintain charge balancing, wherein r×s=m×z, wherein "×" in the latter equation represents multiplication, unlike "x" in Formula (1) where it represents a variable. M' and M" can independently be any of the metal cations described above. Some examples of such compositions, which can be considered quantum dot compositions, include CdS, CdSe, CdTe, $CdS_xSe_{1-x}$, $Cd_3As_2$, ZnS, ZnSe, ZnTe, $ZnS_xSe_{1-x}$, $Zn_3As_2$, $Ga_2S_3$, $Ga_2Se_3$, $Ga_2Te_3$, GaAs, $In_2S_3$, $In_2Se_3$, $In_2Te_3$, InAs, CuS, CuSe, CuTe, $Cu_3As_2$, FeSe, $Fe_3As_2$, FeAs, PbS, PbSe, PbTe, $Pb_3As_2$, HgS, HgSe, HgTe, $Cd_xZn_{1-x}Te$, $Cd_xHg_{1-x}Te$, $Hg_xZn_{1-x}Te$, $Cd_xZn_{1-x}S$, $Cd_xZn_{1-x}Se$, $Cd_xZn_{1-x}S_ySe_{1-y}$, $Cd_xHg_{1-x}Se$, $Hg_xZn_{1-x}Se$, $Pb_xSn_{1-x}Te$, $Ga_xIn_{2-x}Se_3$, and $Ga_xIn_{1-x}As$, wherein x and y are, independently, an integral or non-integral numerical value greater than 0 and less than or equal to 1 (or less than or equal to 2 for the expression 2-x).

In other embodiments, the non-oxide particles have a composition encompassed by the following general formula:

$$Cu(In_xGa_{1-x})X'_2 \qquad (2)$$

In Formula (2) above, x is an integral or non-integral numerical value of or greater than 0 and less than or equal to 1, and X' represents at least one non-metal selected from S, Se, and Te. In different embodiments, X' represents S, Se, Te, or a combination of two or three of these elements. X' can also be represented by the formula $S_jSe_kTe_m$, wherein j, k, and m are independently 0 or an integral or non-integral numerical value greater than 0 and less than or equal to 1, provided that the sum of j, k, and m is 1. Compositions according to Formula (2) and subformulas encompassed therein are collectively referred to herein as CIGs compositions. The CIGs compositions encompassed by Formula (2) may also contain a relative molar ratio of Cu that diverges from 1.

In particular embodiments, the CIGs composition is according to the following sub-formula:

$$CuIn_xGa_{1-x}S_2 \qquad (2a)$$

Some specific examples of compositions according to Formula (2a) include $CuInS_2$, $CuIn_{0.9}Ga_{0.1}S_2$, $CuIn_{0.8}Ga_{0.2}S_2$, $CuIn_{0.7}Ga_{0.3}S_2$, $CuIn_{0.6}Ga_{0.4}S_2$, $CuIn_{0.5}Ga_{0.5}S_2$, $CuIn_{0.4}Ga_{0.6}S_2$, $CuIn_{0.3}Ga_{0.7}S_2$, $CuIn_{0.2}Ga_{0.8}S_2$, $CuIn_{0.1}Ga_{0.9}S_2$, and $CuGaS_2$.

In other particular embodiments, the CIGs composition is according to the following sub-formula:

$$CuIn_xGa_{1-x}Se_2 \qquad (2b)$$

Some specific examples of compositions according to Formula (2b) include $CuInSe_2$, $CuIn_{0.9}Ga_{0.1}Se_2$, $CuIn_{0.8}Ga_{0.2}Se_2$, $CuIn_{0.7}Ga_{0.3}Se_2$, $CuIn_{0.6}Ga_{0.4}Se_2$, $CuIn_{0.5}Ga_{0.5}Se_2$, $CuIn_{0.4}Ga_{0.6}Se_2$, $CuIn_{0.3}Ga_{0.7}Se_2$, $CuIn_{0.2}Ga_{0.8}Se_2$, $CuIn_{0.1}Ga_{0.9}Se_2$, and $CuGaSe_2$.

In yet other particular embodiments, the CIGs composition is according to the following sub-formula:

$$CuIn_xGa_{1-x}Te_2 \qquad (2c)$$

Some specific examples of compositions according to Formula (2c) include $CuInTe_2$, $CuIn_{0.9}Ga_{0.1}Te_2$, $CuIn_{0.8}Ga_{0.2}Te_2$, $CuIn_{0.7}Ga_{0.3}Te_2$, $CuIn_{0.6}Ga_{0.4}Te_2$, $CuIn_{0.5}Ga_{0.5}Te_2$, $CuIn_{0.4}Ga_{0.6}Te_2$, $CuIn_{0.3}Ga_{0.7}Te_2$, $CuIn_{0.2}Ga_{0.8}Te_2$, $CuIn_{0.1}Ga_{0.9}Te_2$, and $CuGaTe_2$.

In some embodiments, the non-oxide particles have a composition encompassed by the following general formula:

$$M_xX''X'_y \qquad (3)$$

In Formula (3) above, M represents at least one chalcophile (for example, divalent or monovalent) metal species other than Sn, X" is selected from Ge, Sn, As, and Sb, or a combination thereof, X' is selected from S, Se, and Te, x is 2 or 3, and y is 2, 3, or 4 (more typically, 3 or 4). In particular embodiments, M represents one, two, three, or four metals selected from Cu, Fe, Zn, and Cd.

In particular embodiments of Formula (3), the non-oxide particles have a quaternary kesterite-type composition encompassed by the following general formula:

$$M_3SnX'_4 \qquad (4)$$

In Formula (4) above, M represents at least one chalcophile metal other than Sn, and X' is as defined above. The relative molar ratio of Sn encompassed by Formula (4) may diverge from 1.

In some embodiments, the kesterite-type compositions of Formula (4) are encompassed by the following sub-generic formula:

$$Cu_{3-x}M'_xSnX'_4 \qquad (4a)$$

In Formula (4a), M' represents one or more chalcophile metals other than Cu, and X' is as defined above (S, Se, and/or Te). In particular embodiments, M' represents one, two, or three metals selected from any chalcophile metal, such as, for example, V, Cr, Mn, Co, Ni, Fe, Zn, Cd, Cu, Mo, W, Pd, Pt, Au, Ag, Hg, Ga, In, Tl, Ge, Sn, Pb, Sb, and Bi. Some metals particularly considered herein include Fe, Zn, and Cd. The subscript x is an integral or non-integral numerical value of or greater than 0 and up to or less than 1, 2, or 3. In different embodiments, x can be selected to be a value of precisely or about 1, 2, or 3, or a non-integral value between 0 and 3, wherein the term "about" generally indicates within ±0.5, ±0.4, ±0.3, ±0.2, or ±0.1 of the value. For example, a value of about 1 generically indicates, in its broadest sense, that x can be 0.5 to 1.5 (i.e., 1±0.5).

Some particular kesterite-type compositions of Formula (4a) are encompassed by the following sub-generic formula:

$$Cu_{3-x}Zn_xSnX'_4 \qquad (4a-1)$$

In Formula (4a-1), x and X' are as described above under Formula (3) or (4a). Some specific examples of compositions according to Formula (4a-1) when X' is S include $Cu_3SnS_4$ (kuramite), $Cu_2ZnSnS_4$ (kesterite), $CuZn_2SnS_4$, $Cu_{0.5}Zn_{2.5}SnS_4$, $Cu_{2.5}Zn_{0.5}SnS_4$, $Cu_{1.5}Zn_{1.5}SnS_4$, and $Zn_3SnS_4$. Other examples of compositions according to Formula (4a-1) are provided by replacing S in the foregoing examples with Se, Te, or a combination of non-metals selected from S, Se, and Te. The relative molar ratio of Sn encompassed by formula (4a-1) may diverge from 1.

Other particular kesterite-type compositions of formula (4a) are encompassed by the following sub-generic formula:

$$Cu_{3-x}Fe_xSnX'_4 \qquad (4a-2)$$

In Formula (4a-2), x and X' are as described above under Formula (4a). Some specific examples of compositions according to Formula (4a-2) when X is S include $Cu_3SnS_4$, $Cu_2FeSnS_4$ (stannite), $CuFe_2SnS_4$, $Cu_{0.5}Fe_{2.5}SnS_4$, $Cu_{2.5}Fe_{0.5}SnS_4$, $Cu_{1.5}Fe_{1.5}SnS_4$, and $Fe_3SnS_4$. Other examples of compositions according to Formula (4a-2) are provided by replacing S in the foregoing examples with Se, Te, or a combination of non-metals selected from S, Se, and Te. The relative molar ratio of Sn encompassed by Formula (4a-2) may diverge from 1.

Other particular kesterite-type compositions of Formula (4a) are encompassed by the following sub-generic formula:

$$Cu_{3-x}Cd_xSnX'_4 \qquad (4a-3)$$

In Formula (4a-3), x and X' are as described above under Formula (4a). Some specific examples of compositions according to Formula (4a-3) when X is S include $Cu_3SnS_4$, $Cu_2CdSnS_4$ (cernyite), $CuCd_2SnS_4$, $Cu_{0.5}Cd_{2.5}SnS_4$, $Cu_{2.5}Cd_{0.5}SnS_4$, $Cu_{1.5}Cd_{1.5}SnS_4$, and $Cd_3SnS_4$. Other examples of compositions according to Formula (4a-3) are provided by replacing S in the foregoing examples with Se, Te, or a combination of non-metals selected from S, Se, and Te. The relative molar ratio of Sn encompassed by Formula (4a-3) may diverge from 1.

In other embodiments, the kesterite-type compositions of Formula (4) are encompassed by the following sub-generic formula:

$$Cu_2M'_xM'_{1-x}SnX'_4 \qquad (4b)$$

In Formula (4b), each M' is defined as above under Formula (4a), x is an integral or non-integral numerical value of or greater than 0 and up to or less than 1, and X' is as defined above. In particular embodiments, the two M' metals in Formula (4b) are not the same, i.e., the two M' metals in Formula (4b) are different. The relative molar ratio of Sn encompassed by Formula (4b) may diverge from 1, and the relative molar ratio of Cu encompassed by Formula (4b) may diverge from 2.

Some particular kesterite-type compositions of Formula (4b) are encompassed by the following sub-generic formula:

$$Cu_2Fe_xZn_{1-x}SnX'_4 \qquad (4b-1)$$

Some specific examples of compositions according to Formula (4b-1) when X is S include $Cu_2Fe_{0.1}Zn_{0.9}SnS_4$, $Cu_2Fe_{0.2}Zn_{0.8}SnS_4$, $Cu_2Fe_{0.3}Zn_{0.7}SnS_4$, $Cu_2Fe_{0.4}Zn_{0.6}SnS_4$, $Cu_2Fe_{0.5}Zn_{0.5}SnS_4$, $Cu_2Fe_{0.6}Zn_{0.4}SnS_4$, $Cu_2Fe_{0.7}Zn_{0.3}SnS_4$, $Cu_2Fe_{0.8}Zn_{0.2}SnS_4$, and $Cu_2Fe_{0.9}Zn_{0.1}SnS_4$. Other examples of compositions according to Formula (4b-1) are provided by replacing S in the foregoing examples with Se, Te, or a combination of non-metals selected from S, Se, and Te. The relative molar ratio of Sn encompassed by Formula (4b-1) may diverge from 1, and the relative molar ratio of Cu encompassed by Formula (4b-1) may diverge from 2.

In other embodiments, the kesterite-type compositions of Formula (4) are encompassed by the following sub-generic formula:

$$CuM'_xM'_{2-x}SnX'_4 \qquad (4c)$$

In Formula (4c), each M' is defined as above under Formula (4a), x is an integral or non-integral numerical value of at least or greater than 0 and up to or less than 1 or 2, and X' is as defined above. In particular embodiments, the two M' metals in Formula (4c) are not the same, i.e., the two M' metals in Formula (4c) are different. In different embodiments, x can be selected to be a value of precisely or about 1 or 2, or a non-integral value between 0 and 2, wherein the term "about" is as defined under Formula (4a). The relative molar ratio of Sn and Cu encompassed by Formula (4c) may each diverge from 1.

Some particular kesterite-type compositions of Formula (4c) are encompassed by the following sub-generic formula:

$$CuFe_xZn_{2-x}SnX'_4 \qquad (4c-1)$$

Some specific examples of compositions according to Formula (4c-1) when X' is S (i.e., $CuFe_xZn_{2-x}SnS_4$) include $CuFe_{0.5}Zn_{1.5}SnS_4$, $CuFeZnSnS_4$, and $CuFe_{1.5}Zn_{0.5}SnS_4$. Other examples of compositions according to Formula (4c-1) are provided by replacing S in the foregoing examples with Se, Te, or a combination of non-metals selected from S, Se, and Te. The relative molar ratio of Sn and Cu encompassed by Formula (4c-1) may each diverge from 1.

In other embodiments of Formula (3), the non-oxide particles have a tertiary kesterite-type composition encompassed by the following general formula:

$$M_2SnX'_3 \qquad (5)$$

In Formula (5) above, M represents at least one chalcophile (typically divalent) metal other than Sn, as further described above, and X' is as defined above. In particular embodiments, M represents one, two, three, or four metals selected from Cu, Fe, Zn, and Cd. The relative molar ratio of Sn encompassed by Formula (5) may diverge from 1. Some examples of compositions according to Formula (5) include $Cu_2SnS_3$, $Cu_2SnSe_3$, $Cu_2SnTe_3$, $Fe_2SnS_3$, $Fe_2SnSe_3$, $Fe_2SnTe_3$, $Zn_2SnS_3$, $Zn_2SnSe_3$, $Zn_2SnTe_3$, $Cd_2SnS_3$, $Cd_2SnSe_3$, and $Cd_2SnTe_3$, as well as such composition wherein X' includes a combination of two or three chalcogens selected from S, Se, and Te, e.g., $Cu_2SnSSe_2$, and/or wherein M represents two or more metal species, e.g., $CuZnSnS_3$, $CuCdSnS_3$, $CuFeSnS_3$, $ZnCdSnS_3$, $CuZnSnSe_3$, and $CuZnSnTe_3$.

In other embodiments of Formula (3), the non-oxide particles have a thermoelectric composition encompassed by the following general formula:

$$M_3SbX'_4 \qquad (6)$$

In Formula (6) above, M represents at least one chalcophile (typically divalent) metal other than Sb, as further described above, and X' is as defined above. In particular embodiments, M represents one, two, three, or four metals selected from Cu, Fe, Zn, and Cd. The relative molar ratio of Sb encompassed by Formula (6) may diverge from 1. Some examples of compositions according to Formula (6) include $Cu_3SbS_4$, $Cu_3SbSe_4$, $Cu_3SbTe_4$, $Fe_3SbS_4$, $Fe_3SbSe_4$, $Fe_3SbTe_4$, $Zn_3SbS_4$, $Zn_3SbSe_4$, $Zn_3SbTe_4$, $Cd_3SbS_4$, $Cd_3SbSe_4$, and $Cd_3SbTe_4$, as well as such composition wherein X' includes a combination of two or three chalcogens selected from S, Se, and Te, e.g., $Cu_3SbSSe_3$, and/or wherein M represents two or more metal species, e.g., $Cu_2ZnSbS_3$, $Cu_2CdSbS_3$, $Cu_2FeSbS_3$, $ZnCdSbS_3$, $Cu_2ZnSbSe_3$, and $Cu_2ZnSbTe_3$.

In other embodiments of Formula (3), the non-oxide particles have a thermoelectric composition encompassed by the following general formula:

$$M_3GeX'_4 \qquad (7)$$

In Formula (7) above, M represents at least one chalcophile (typically divalent) metal other than Ge, as further described above, and X' is as defined above. In particular embodiments, M represents one, two, three, or four metals selected from Cu, Fe, Zn, and Cd. The relative molar ratio of Ge encompassed by Formula (7) may diverge from 1. Some examples of compositions according to Formula (7) include $Cu_3GeS_4$, $Cu_3GeSe_4$, $Cu_3GeTe_4$, $Fe_3GeS_4$, $Fe_3GeSe_4$, $Fe_3GeTe_4$, $Zn_3GeS_4$, $Zn_3GeSe_4$, $Zn_3GeTe_4$, $Cd_3GeS_4$, $Cd_3GeSe_4$, and $Cd_3GeTe_4$, as well as such composition wherein X' includes a combination of two or three chalcogens selected from S, Se, and Te, e.g., $Cu_3GeSSe_3$, and/or wherein M represents two or more metal species, e.g., $Cu_2ZnGeS_3$, $Cu_2CdGeS_3$, $Cu_2FeGeS_3$, $ZnCdGeS_3$, $Cu_2ZnGeSe_3$, and $Cu_2ZnGeTe_3$.

In other embodiments of Formula (3), the non-oxide particles have a thermoelectric composition encompassed by the following general formula:

$$M_3ArX'_4 \qquad (8)$$

In Formula (8) above, M represents at least one chalcophile (typically divalent) metal other than Ar, as further described above, and X' is as defined above. In particular embodiments, M represents one, two, three, or four metals selected from Cu, Fe, Zn, and Cd. The relative molar ratio of Ar encompassed by Formula (8) may diverge from 1. Some examples of compositions according to Formula (8) include $Cu_3ArS_4$, $Cu_3ArSe_4$, $Cu_3ArTe_4$, $Fe_3ArS_4$, $Fe_3ArSe_4$, $Fe_3ArTe_4$, $Zn_3ArS_4$, $Zn_3ArSe_4$, $Zn_3ArTe_4$, $Cd_3ArS_4$, $Cd_3ArSe_4$, and $Cd_3ArTe_4$, as well as such composition wherein X' includes a combination of two or three chalcogens selected from S, Se, and Te, e.g., $Cu_3ArSSe_3$, and/or wherein M represents two or more metal species, e.g., $Cu_2ZnArS_3$, $Cu_2CdArS_3$, $Cu_2FeArS_3$, $ZnCdArS_3$, $Cu_2ZnArSe_3$, and $Cu_2ZnArTe_3$.

In other respects, the produced metal-containing particles are metal oxide particles. As used herein, the term "metal oxide" indicates compounds or materials containing at least one metal species and oxide atoms, and the term "mixed-metal oxide" indicates compounds or materials containing at least two different metal species and oxide atoms. When more than one metal is included, the metals may be substantially intermixed throughout the mixed-metal oxide such that separate phases do not exist. Alternatively, the different metals may form distinct phases composed of different metal oxide compositions in the mixed-metal oxide. The metal oxide compounds or materials may or may not further contain, for example, one or more dopant or trace metal species, chemisorbed water, water of hydration, or adsorbed molecular groups. In some embodiments, the oxide composition may correspond to any of the non-oxide compositions provided above, except that at least a portion or all of the chalcogen or pnictogen species therein are replaced with oxide atoms.

In a first set of embodiments, the produced metal oxide particles have an oxide composition that contains one metal species, which is herein designated as a mono-metal oxide composition. In a second set of embodiments, the produced metal oxide particles have an oxide composition that contains at least two (or at least three, four, or more) metal species, which is herein designated as a mixed-metal oxide composition.

In some embodiments, the one or more metal species in the metal oxide composition is or includes a transition metal, i.e., Groups III-XII (scandium through zinc groups) of the Periodic Table. In some embodiments, the metal species is or includes a first-row transition metal. Some examples of first-row transition metal ions include Sc(III), Ti(IV), V(III), V(IV), V(V), Cr(III), Cr(VI), Mn(VII), Mn(V), Mn(V), Mn(III), Fe(II), Fe(III), Co(III), Ni(III), Cu(I), and Cu(II). In other embodiments, the metal species is or includes a second-row transition metal. Some examples of second-row transition metal ions include Y(III), Zr(IV), Nb(IV), Nb(V), Mo(IV), Mo(VI), Ru(IV), Ru(VIII), Rh(III), Rh(IV), Pd(II), Ag(I), and Cd(II). In other embodiments, the metal species is or includes a third-row transition metal. Some examples of third-row transition metal species include Hf(IV), Ta(V), W(III), W(IV), W(VI), Re(IV), Re(VII), Ir(IV), Pt(IV), and Au(III). Some examples of metal oxide compositions containing a transition metal include the mono-metal oxide compositions $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$, as well as mixed-metal oxide compositions wherein one or more metals replace a portion of any of the metals in the foregoing compositions, e.g., replacing a portion of Fe in $Fe_3O_4$ with Co to result in $CoFe_2O_4$, or wherein any of the foregoing metal oxide compositions are in admixture. Other examples of metal oxide compositions include the paratungstates and polyoxometallates, e.g., polyoxomolybdates, polyoxotungstates, and polyoxovanadates.

In other embodiments, the one or more metal species in the metal oxide composition is or includes an alkali, alkaline earth, main group, or lanthanide metal. Some examples of alkali metal species include $Li^+$, $Na^+$, $K^+$, and $Rb^+$, which may be incorporated in such mono-metal oxide compositions as $Li_2O$, $Na_2O$, $K_2O$, and $Rb_2O$. Some examples of alkaline earth metal species include $Be^{2+}$, $Mg^{2+}$, $Ca^{2+}$, and $Sr^{2+}$, which may be incorporated in such mono-metal oxide compositions as BeO, MgO, CaO, and SrO. Some examples of main group metal species (e.g., cations of Group IIIA-VIIA of the Periodic Table), include $B^{3+}$, $Al^{3+}$, $Ga^{3+}$, $In^{3+}$, $Tl^{1+}$, $Tl^{3+}$, $Si^{4+}$, $Ge^{4+}$, $Sn^{2+}$, $Sn^{4+}$, $Pb^{2+}$, $Pb^{4+}$, $N^{3+}$, $P^{3+}$, $P^{5+}$, $As^{3+}$, $As^{5+}$, $Sb^{3+}$, $Sb^{5+}$, and $Bi^{3+}$, which may be incorporated in such mono-metal oxide composition as $B_2O_3$, $Ga_2O_3$, SnO, $SnO_2$, PbO, $PbO_2$, $Sb_2O_3$, $Sb_2O_5$, and $Bi_2O_3$. Some examples of lanthanide metal species include any of the elements in the Periodic Table having an atomic number of 57 to 71, e.g., $La^{3+}$, $Ce^{3+}$, $Ce^{4+}$, $Pr^{3+}$, $Nd^{3+}$, $Sm^{3+}$, $Eu^{3+}$, $Gd^{3+}$, and $Tb^{3+}$, which may be incorporated in such mono-metal oxide composition as $La_2O_3$, $Ce_2O_3$, and $CeO_2$.

In a first set of embodiments, the produced metal oxide particles have an oxide composition that is a mono-metal oxide composition in which the metal species is selected from Sc, Ti, V, Cr, Mn, Fe, Co, Ni, Cu, Zn, Y, Zr, Nb, Hf, Ta, Cd, Mo, W, Ag, Pd, Pt, Ga, In, Tl, Ge, Sn, Pb, Sb, and Bi. In a second set of embodiments, the produced metal oxide particles have an oxide composition that is a mixed-metal oxide composition that includes at least one, two, three, or four metals selected from Sc, Ti, V, Cr, Mn, Fe, Co, Ni, Cu, Zn, Y, Zr, Nb, Hf, Ta, Cd, Mo, W, Ag, Pd, Pt, Ga, In, Tl, Ge, Sn, Pb, Sb, and Bi, or in which all of the metals are exclusively selected from the foregoing list of metal species.

In some embodiments, any one or more classes or specific types of metal species described above are excluded from the oxide composition. In other embodiments, two or more classes or specific types of metal species described above may be combined.

In some embodiments, the metal oxide particles have a mono-metal or mixed-metal oxide composition of the general formula:

$$[(M'_xM''_{w-x})^{+r}]_sO_y \qquad (9)$$

In Formula (9) above, each of M' and M" represents at least one metal cation, at least one of which is a transition metal cation, wherein M' and M" are the same or different, and the subscripts w, x, s, r, and y are integer or fractional numbers that together maintain charge balancing, wherein r×s=2y. M' and M" can independently be any of the metal cations described above. Some examples of such compositions (e.g., $CoFe_2O_4$) have been provided above.

In some embodiments, the metal oxide particles have a perovskite structure of the formula:

$$M'M''O_3 \qquad (10)$$

In Formula (10) above, M' and M" are typically different metal cations, thereby being further exemplary of mixed-metal oxide compositions. The metal cations can be independently selected from, for example, the first, second, and third row transition metals, lanthanide metals, and main group (particularly Groups IIIA and IVA) metals, such as Pb and Bi. More typically, M' represents a trivalent metal (often from Group IIIB) and M" represents a transition metal, and more typically, a first row transition metal. Some examples of perovskite oxides include $LaCrO_3$, $LaMnO_3$, $LaFeO_3$, $YCrO_3$, and $YMnO_3$.

It is also possible for M' and M'' in Formula (10) to be the same metal, wherein Formula (10) reduces to $M'_2O_3$. In these compositions, M' is typically a first row transition metal. Some examples of such compositions include $Cr_2O_3$, and $Fe_2O_3$, both having the corundum crystal structure, and $Mn_2O_3$, having the bixbyite crystal structure.

In other embodiments, the metal oxide particles have a spinel structure of the formula:

$$M'_x M''_{3-x} O_4 \qquad (11)$$

In Formula (11) above, M' and M'' are the same or different metal cations. Typically, at least one of M' and M'' is a transition metal cation, and more typically, a first-row transition metal cation. In order to maintain charge neutrality with the four oxide atoms, the oxidation states of M' and M'' sum to +8. Generally, two-thirds of the metal ions are in the +3 state while one-third of the metal ions are in the +2 state. The +3 metal ions generally occupy an equal number of tetrahedral and octahedral sites, whereas the +2 metal ions generally occupy half of the octahedral sites. However, Formula (11) includes other chemically-acceptable possibilities, including that the +3 metal ions or +2 metal ions occupy only octahedral or tetrahedral sites, or occupy one type of site more than another type of site. The subscript x can be any numerical (integral or non-integral) positive value, typically at least 0.01 and up to 1.5.

When M' and M'' in Formula (11) are the same, Formula (11) becomes simplified to the general formula:

$$M_3O_4 \qquad (12)$$

Some examples of compositions according to Formula (12) include $Fe_3O_4$ (magnetite), $Co_3O_4$, and $Mn_3O_4$.

Some examples of spinel oxide compositions having two metals include those of the general composition $M'_y Fe_{3-y} O_4$ (e.g., $Ti_y Fe_{3-y} O_4$, $V_y Fe_{3-y} O_4$, $Cr_y Fe_{3-y} O_4$, $Mn_y Fe_{3-y} O_4$, $Co_y Fe_{3-y} O_4$, $Ni_y Fe_{3-y} O_4$, $Cu_y Fe_{3-y} O_4$, $Zn_y Fe_{3-y} O_4$, $Pd_y Fe_{3-y} O_4$, $Pt_y Fe_{3-y} O_4$, $Cd_y Fe_{3-y} O_4$, $Ru_y Fe_{3-y} O_4$, $Zr_y Fe_{3-y} O_4$, $Nb_y Fe_{3-y} O_4$, $Gd_y Fe_{3-y} O_4$, $Eu_y Fe_{3-y} O_4$, $Tb_y Fe_{3-y} O_4$, and $Ce_y Fe_{3-y} O_4$); the general composition $M'_y Co_{3-y} O_4$ (e.g., $Ti_y Co_{3-y} O_4$, $V_y Co_{3-y} O_4$, $Cr_y Co_{3-y} O_4$, $Mn_y Co_{3-y} O_4$, $Ni_y Co_{3-y} O_4$, $Cu_y Co_{3-y} O_4$, $Zn_y Co_{3-y} O_4$, $Pd_y Co_{3-y} O_4$, $Pt_y Co_{3-y} O_4$, $Cd_y Co_{3-y} O_4$, $Ru_y Co_{3-y} O_4$, $Zr_y Co_{3-y} O_4$, $Nb_y Co_{3-y} O_4$, $Gd_y Co_{3-y} O_4$, $Eu_y Co_{3-y} O_4$, $Tb_y Co_{3-y} O_4$, and $Ce_y Co_{3-y} O_4$); and the general composition $M'_y Ni_{3-y} O_4$ (e.g., $Ti_y Ni_{3-y} O_4$, $V_y Ni_{3-y} O_4$, $Cr_y Ni_{3-y} O_4$, $Mn_y Ni_{3-y} O_4$, $Fe_y Ni_{3-y} O_4$, $Cu_y Ni_{3-y} O_4$, $Zn_y Ni_{3-y} O_4$, $Pd_y Ni_{3-y} O_4$, $Pt_y Ni_{3-y} O_4$, $Cd_y Ni_{3-y} O_4$, $Ru_y Ni_{3-y} O_4$, $Zr_y Ni_{3-y} O_4$, $Nb_y Ni_{3-y} O_4$, $Gd_y Ni_{3-y} O_4$, $Eu_y Ni_{3-y} O_4$, $Tb_y Ni_{3-y} O_4$, and $Ce_y Ni_{3-y} O_4$), wherein y in the general compositions given above represents an integral or non-integral numerical value of at least 0.1 and up to 2; and M' represents one or a combination of metal ions, e.g., $(M'_a, M''_b)_y Fe_{3-y} O_4$, wherein subscripts a and b are non-integral numbers that sum to 1 (e.g., $Mn_{0.5}Zn_{0.5}Fe_2O_4$, $Mn_{0.4}Zn_{0.6}Fe_2O_4$, $Ni_{0.5}Co_{0.5}Fe_2O_4$, and $Ni_{0.4}Co_{0.6}Fe_2O_4$).

In particular embodiments of Formula (11), the spinel structure has the composition:

$$M'M''_2O_4 \qquad (13)$$

In Formula (13) above, M'' is typically a trivalent metal ion and M' is typically a divalent metal ion. More typically, M' and M'' independently represent transition metals, and more typically, first row transition metals. Some examples of spinel compositions include $NiCr_2O_4$, $CuCr_2O_4$, $ZnCr_2O_4$, $CdCr_2O_4$, $MnCr_2O_4$, $NiMn_2O_4$, $CuMn_2O_4$, $ZnMn_2O_4$, $CdMn_2O_4$, $NiCo_2O_4$, $CuCo_2O_4$, $ZnCo_2O_4$, $CdCo_2O_4$, $MnCo_2O_4$, $NiFe_2O_4$, $CuFe_2O_4$, $ZnFe_2O_4$, $CdFe_2O_4$, and $MnFe_2O_4$. M' and M'' can also be combinations of metals, such as in $(Co,Zn)Cr_2O_4$, and $Ni(Cr,Fe)_2O_4$.

In some embodiments, the metal-containing (non-oxide or oxide) particles produced by the methodology described herein possess at least one photoluminescence absorption or emission peak. The peak can be, for example, in the UV, visible, and/or IR range. In different embodiments, the photoluminescence peak is located at, or at least, or above, or less than 200 nm, 250 nm, 300 nm, 320 nm, 340 nm, 360 nm, 380 nm, 400 nm, 420 nm, 440 nm, 460 nm, 480 nm, 500 nm, 520 nm, 540 nm, 560 nm, 580 nm, 600 nm, 620 nm, 640 nm, 660 nm, 680 nm, 700 nm, 720 nm, 740 nm, 760 nm, 780 nm, 800 nm, 820 nm, 840 nm, 860 nm, 880 nm, 900 nm, 920 nm, 940 nm, 960 nm, 980 nm, 1000 nm, 1020 nm, 1040 nm, 1060 nm, 1080 nm, 1100 urn, 1120 nm, 1140 nm, 1160 nm, 1180 nm, 1200 nm, 1220 nm, 1240 nm, 1260 nm, 1280 nm, 1300 nm, 1320 nm, 1340 nm, 1360 nm, 1380 nm, 1400 nm, 1420 nm, 1440 nm, 1460 nm, 1480 nm, 1500 nm, 1600 nm, 1700 nm, 1800 nm, 1900 nm, 2000 nm, 2500 nm, 3000 nm, 3500 nm, 4000 nm, 4500 nm, or 5000 nm, or within ±5 nm, 10 nm, 20 nm, 30 nm, 40 nm, 50 nm, 60 nm, 70 nm, 80 nm, 90 nm, or 100 nm of any of these values, or within a range bounded by any two of these values (e.g., 400-500 nm or 960-980 nm). Some particular ranges considered herein for photoluminescence peaks include 300-500 nm, 300-1500 nm, 500-1000 nm, 500-1500 nm, 435-445 nm, 430-450 nm, 475-525 nm, 1050-1150 nm, 970-980 nm, and 970-1000 nm. In some embodiments, the particles exhibit a photoluminescence peak above 500 nm, 800 nm, 1000 nm, 1200 nm, or 1500 nm.

In particular embodiments, the particles possess a photoluminescence peak characterized by a full-width half maximum (FWHM) value of about or less than 20 nanometers (20 nm). In other embodiments, the particles possess a photoluminescence peak characterized by a FWHM value of about or greater than 20 nm. In different embodiments, the particles possess a photoluminescence peak characterized by a FWHM value of about or at least, or above, or less than 20 nm, 40 nm, 60 nm, 80 nm, 100 nm, 150 nm, 200 nm, 250 nm, 300 nm, 350 nm, 400 nm, 450 nm, 500 nm, 600 nm, 700 nm, 800 nm, 900 nm, 1,000 nm, 1,100 nm, and 1,200 nm. In yet other embodiments, the particles possess a photoluminescence peak having a FWHM value of about or less than 15 nm, 10 nm, 8 nm, or 5 nm.

The method described herein for producing metal-containing particles is practiced by contacting the metal-containing aqueous solution with an electrically powered electrode at a suitable potential that forms particles. The applied potential may be sufficiently cathodic or anodic (i.e., negative or positive, respectively), and may be, for example, about, at least, above, up to, or less than −0.05 V, −0.1 V, −0.2 V, −0.3 V, −0.4 V, −0.45 V, −0.5 V, −0.6 V, −0.7 V, −0.8 V, −0.9 V, −1 V, −1.1 V, −1.2 V, 0 V, +0.05 V, +0.1 V, +0.2 V, +0.3 V, +0.4 V, +0.45 V, +0.5 V, +0.6 V, +0.7 V, +0.8 V, +0.9 V, +1 V, +1.1 V, or +1.2 V vs. the hydrogen electrode. Some other conditions that can affect formation of particles include temperature, reaction time, precursor metal concentration, pH, and type of electrode used. The temperature of the reaction (i.e., of the aqueous solution during electrochemical processing) can be, for example, about, at least, above, up to, or less than −10° C., −5° C., 0° C., 15° C., 20° C., 25° C., 30° C., 40° C., 45° C., 50° C., 55° C., 60° C., 65° C., 70° C., 75° C., 80° C., 85° C., 90° C., or 100° C., or a temperature within a range bounded by any two of the foregoing exemplary temperatures, wherein the term "about", used for the temperature, generally indicates within ±5, ±4, ±3, ±2, or ±1° C. of the indicated temperature. In some embodiments, the process is conducted at room or ambient temperature, which is typically a temperature of 18-30° C., more typically 20-25° C., or about 22° C.

The reaction (incubation) time is the period of time that the combined reaction components are subjected to reaction conditions necessary for producing particles. The reaction time is very much dependent on the other conditions used, as well as the characteristics desired in the particle product. For example, shorter reaction times (e.g., 1-60 minutes) may be used at elevated temperature conditions whereas longer reaction times (e.g., 1-7 days, or 1-3 weeks) may be used at lower temperatures to obtain a similar yield of product. Typically, shorter reaction times produce smaller particles than particles produced using longer reaction times under the same conditions. The incubation may be, for example, between 3 and 30 days, depending on the amount and size of the particle product desired.

In addition to selecting reaction conditions (e.g., temperature, reaction time, and pH) on the basis of permitting or inducing the formation of particles, the reaction conditions can also be selected for numerous other purposes, including to modify or optimize the product yield, production efficiency, particle size or size range, particle composition or phase (e.g., crystalline vs. semicrystalline vs. amorphous), or particle morphology. For example, lower reaction temperatures may be employed to provide a more pure or single-crystalline product.

Once the particles are produced, they are isolated (i.e., separated) from the reaction components and byproducts formed by the reaction products. Any method known in the art for separation of particles from reaction components can be used herein.

In one embodiment, the particles are separated from the electrochemical reaction components by allowing the particles to settle to the bottom of the container and then decanting the liquid medium or filtering off the particles. This settling may be accomplished with or without centrifugation. When centrifugation is used, the centrifugal (i.e., "g" force) causes settling of denser particles to the bottom or distal end of the spun containers. The collected particles may be washed one or more times to further purify the product. The reaction container may optionally be fitted with a drain valve to allow the solid product to be removed without decanting the medium or breaking gas seals.

In another embodiment, the container in which the aqueous solution is housed is attached to (or includes) an external trap from which the particles can be removed. The trap is preferably in the form of a recess situated below flowing reaction solution. Particles in the flowing reaction solution are denser than the reaction solution, and hence, will settle down into the trap. The flowing reaction solution is preferably recirculated.

In another embodiment, a filter is used to trap the produced particles. The filter can be in the form of multiple filters that trap successively smaller particles. Depending on the particle size and other variables, one or more filters that trap the non-oxide particles may contain a pore size of no more than about 0.5, 0.4, 0.3, 0.25, 0.2, 0.1, or 0.05 □m.

In yet another embodiment, in the case where the produced particles are magnetic, a magnetic source (e.g., electromagnet or other suitable magnetic field-producing device) can be employed to collect the particles. The magnetic source can be used as the sole means of separation, or used in combination with other separation means, such as a trap or filter.

When two or more metals are used as precursors, the molar ratio of metal ions can be adjusted such that a particular molar ratio of metals is provided in the particle product. Typically, the molar ratio of metal ions in the metal component is the molar ratio of metals found in the particle product. However, the molar ratio of metals in the product may, in several embodiments, differ from the molar ratio of metals in the aqueous solution. In a particular embodiment, a desired molar ratio of metals is achieved in the particle product by suitable adjustment of metal ratios in the aqueous solution.

The metal salt concentration in the aqueous solution can be any suitable concentration at which the electrochemical process can function to make particles. For example, in different embodiments, the metal salt concentration is at least, above, up to, or less than, for example, 10 nM, 50 nM, 100 nM, 500 nM, 1 □M, 10 □M, 100 □M, 500 □M, 1 mM, 5 mM, 10 mM, 50 mM, 100 mM, 500 mM, 1 M, 2 M, or 5M, or up to the saturation concentration of one or more metal salts, or the metal salt concentration is within a range bounded by any two of the above exemplary values.

In the particular case of producing metal non-oxide (e.g., metal chalcogenide or metal pnictide) particles, a non-metal component (e.g., reducible chalcogen-containing substance) is included in the aqueous solution to provide the resulting non-oxide particle composition with one or more chalcogen or pnictogen non-metals, e.g., S, Se, Te, N, P, As, Sb, or Bi. The non-metal component can include any suitable form of these non-metals, including, for example, the elemental or compound (i.e., "chalcogenide compound") forms of these non-metals.

In a first embodiment, the non-metal component includes a source of sulfur. The source of sulfur can be, for example, elemental sulfur($S^0$) or a sulfur-containing compound. In one instance, the sulfur-containing compound is an inorganic sulfur-containing compound. Some examples of inorganic sulfur-containing compounds include the inorganic sulfates (e.g., $Na_2SO_4$, $K_2SO_4$, $MgSO_4$, $(NH_4)_2SO_4$, $H_2SO_4$, or a metal sulfate), the inorganic sulfites (e.g., $Na_2SO_3$, $H_2SO_3$, or $(NH_4)_2SO_3$), inorganic thiosulfates (e.g., $Na_2S_2O_3$ or $(NH_4)_2S_2O_3$), sulfur dioxide, peroxomonosulfate (e.g., $Na_2SO_5$ or $KHSO_5$), and peroxodisulfate (e.g., $Na_2S_2O_8$, $K_2S_2O_8$, or $(NH_4)_2S_2O_8$). In another instance, the sulfur-containing compound is an organosulfur (i.e., organothiol or organomercaptan) compound. The organosulfur compound contains at least one hydrocarbon group and is typically characterized by the presence of at least one sulfur-carbon bond. Some examples of suitable organosulfur compounds include the hydrocarbon mercaptans (e.g., methanethiol, ethanethiol, propanethiol, butanethiol, thiophenol, ethanedithiol, 1,3-propanedithiol, 1,4-butanedithiol, thiophene), the alcohol-containing mercaptans (e.g., 2-mercaptoethanol, 3-mercaptopropanol, 4-mercaptophenol, and dithiothreitol), the mercapto-amino acids (e.g., cysteine, homocysteine, methionine, thioserine, thiothreonine, and thiotyrosine), mercapto-peptides (e.g., glutathione), the mercapto-pyrimidines (e.g., 2-thiouracil, 6-methyl-2-thiouracil, 4-thiouracil, 2,4-dithiouracil, 2-thiocytosine, 5-methyl-2-thiocytosine, 5-fluoro-2-thiocytosine, 2-thiothymine, 4-thiothymine, 2,4-dithiothymine, and their nucleoside and nucleotide analogs), the mercapto-purines (e.g., 6-thioguanine, 8-thioadenine, 2-thioxanthine, 6-thioxanthine, 6-thiohypoxanthine, 6-thiopurine, and their nucleoside and nucleotide analogs), the thioethers (e.g., dimethylsulfide, diethylsulfide, diphenylsulfide, biotin), the disulfides (e.g., cystine, lipoic acid, diphenyl disulfide, iron disulfide, and 2-hydroxyethyldisulfide), the thiocarboxylic acids (e.g., thioacetic acid), the thioesters, the sulfonium salts (e.g., trimethylsulfonium or diphenylmethylsulfonium chloride), the sulfoxides (e.g., dimethylsulfoxide), the sulfones (e.g., dimethylsulfone), thioketones, thioamides, thiocyanates, isothiocyanates, thiocarbamates, dithiocarbamates, and trialkylphosphine sulfide (e.g., trioctylphosphine sulfide), thiourea compounds, or any of the inorganic sulfur-containing compounds, such as those enumerated above, which have been modified by inclusion of a hydrocarbon group. In particular embodiments, the organosulfur compound includes a sulfur-containing nucleic base (i.e., S-nucleobase), such as any of the mercapto-pyrimidines and mercapto-purines described above.

In a second embodiment, the non-metal component includes a selenium-containing compound. The source of selenium can be, for example, elemental selenium ($Se^0$) or a selenium-containing compound. In one instance, the selenium-containing compound is an inorganic selenium-containing compound. Some examples of inorganic selenium-containing compounds include the inorganic selenates (e.g., $Na_2SeO_4$, $K_2SeO_4$, $MgSeO_4$, $(NH_4)_2SeO_4$, $H_2SeO_4$, or a metal selenate), the inorganic selenites (e.g., $Na_2SeO_3$, $H_2SeO_3$, or $(NH_4)_2SeO_3$), inorganic selenosulfates (e.g., $Na_2SSeO_3$ or $(NH_4)_2SSeO_3$), selenium dioxide, and selenium disulfide. In another instance, the selenium-containing compound is an organoselenium compound. The organoselenium compound contains at least one hydrocarbon group and is typically characterized by the presence of at least one selenium-carbon bond. Some examples of suitable organoselenium compounds include the hydrocarbon selenols (e.g., methaneselenol, ethaneselenol, n-propaneselenol, isopropaneselenol, and selenophenol (benzeneselenol)), the seleno-amino acids (e.g., selenocysteine, selenocystine, selenohomocysteine, selenomethionine), the selenopyrimidines (e.g., 2-selenouracil, 6-methyl-2-selenouracil, 4-selenouracil, 2,4-diselenouracil, 2-selenocytosine, 5-methyl-2-selenocytosine, 5-fluoro-2-selenocytosine, 2-selenothymine, 4-selenothymine, 2,4-diselenothymine, and their nucleoside and nucleotide analogs), the selenopurines (e.g., 6-selenoguanine, 8-selenoadenine, 2-selenoxanthine, 6-selenoxanthine, 6-selenohypoxanthine, 6-selenopurine, and their nucleoside and nucleotide analogs), the selenides (e.g., dimethylselenide, diethylselenide, and methylphenylselenide), the diselenides (e.g., dimethyldiselenide, diethyldiselenide, and diphenyldiselenide), the selenocarboxylic acids (e.g., selenoacetic acid, selenopropionic acid), the selenosulfides (e.g., dimethylselenosulfide), the selenoxides (e.g., dimethylselenoxide and diphenylselenoxide), the selenones, the selenonium salts (e.g., dimethylethylselenonium chloride), the vinylic selenides, selenopyrylium salts, trialkylphosphine selenide (e.g., trioctylphosphine selenide, i.e., TOPSe), selenourea compounds, or any of the inorganic selenium-containing compounds, such as those enumerated above, which have been modified by inclusion of a hydrocarbon group. In particular embodiments, the organoselenium compound includes a selenium-containing nucleic base (i.e., Se-nucleobase), such as any of the selenopyrimidines and selenopurines described above.

In a third embodiment, the non-metal component includes a tellurium-containing compound. The source of tellurium can be, for example, elemental tellurium ($Te^0$) or a tellurium-containing compound. In one instance, the tellurium-containing compound is an inorganic tellurium-containing compound. Some examples of inorganic tellurium-containing compounds include the inorganic tellurates (e.g., $Na_2TeO_4$, $K_2TeO_4$, $MgTeO_4$, $(NH_4)_2TeO_4$, $H_2TeO_4$, $H_6TeO_6$, or a metal tellurate), the inorganic tellurites (e.g., $Na_2TeO_3$), and tellurium dioxide. In another instance, the tellurium-containing compound is an organotellurium compound. The organotellurium compound contains at least one hydrocarbon group and is typically characterized by the presence of at least one tellurium-carbon bond. Some examples of suitable organotellurium compounds include the hydrocarbon tellurols (e.g., methanetellurol, ethanetellurol, n-propanetellurol, isopropanetellurol, and tellurophenol (benzenetellurol)), the telluro-amino acids (e.g., tellurocysteine, tellurocystine, tellurohomocysteine, telluromethionine), the telluropyrimidines and their nucleoside and nucleotide analogs (e.g., 2-tellurouracil), the telluropurines and their nucleoside and nucleotide analogs, the tellurides (e.g., dimethyltelluride, diethyltelluride, and methylphenyltelluride), the ditellurides (e.g., dimethylditelluride, diethylditelluride, and diphenylditelluride), the telluroxides (e.g., dimethyltelluroxide and diphenyltelluroxide), the tellurones, the telluronium salts, the vinylic tellurides, telluropyrylium salts, tellurourea compounds, 24-telluracholestanol, or any of the inorganic tellurium-containing compounds, such as those enumerated above, which have been modified by inclusion of a hydrocarbon group. In particular embodiments, the organotellurium compound includes a tellurium-containing nucleic base (i.e., Te-nucleobase), such as any of the telluropyrimidines and telluropurines described above.

In a fourth embodiment, the non-metal component includes an arsenic-containing compound. In one instance, the arsenic-containing compound is an inorganic arsenic-containing compound. Some examples of inorganic arsenic-containing compounds include the inorganic arsenates (e.g., $Na_3AsO_4$, $Na_2HAsO_4$, $NaH_2AsO_4$, $H_3AsO_4$, $Mg_3(AsO_4)_2$, 1-arseno-3-phosphoglycerate, or a transition metal arsenate), inorganic arsenates (e.g., $Na_3AsO_3$, $Na_2HAsO3$, $NaH_2AsO_3$, $H_3AsO_3$, $Ag_3AsO_3$, $Mg_3(AsO_3)_2$), and arsenic oxides (e.g., $As_2O_3$ and $As_2O_5$), and arsenous carbonate (i.e., $As_2(CO_3)_3$). In another instance, the arsenic-containing compound is an organoarsine compound. The organoarsine compound is characterized by the presence of at least one hydrocarbon group and at least one arsenic atom. Some examples of suitable organoarsine compounds include the hydrocarbon arsines (e.g., trimethylarsine, triethylarsine, triphenylarsine, arsole, and 1,2-bis(dimethylarsino)benzene), arsenic-derivatized sugars (e.g., glucose 6-arsenate), arsonic acids (e.g., phenylarsonic acid, 4-aminophenylarsonic acid, 4-hydroxy-3-nitrobenzenearsonic acid, 2,3,4-trihydroxybutylarsonic acid, arsonoacetic acid, diphetarsone, diphenylarsinic acid, and 3-arsonopyruvate), arsenoamino acids and their derivatives (e.g., 3-arsonoalanine, arsenophenylglycine, and arsenate tyrosine), organoarsine oxides (e.g., methylarsine oxide, 4-aminophenylarsenoxide, oxophenylarsine, and oxophenarsine), 10,10'-oxybis-10H-phenoxarsine, 1-arseno-3-phosphoglycerate, arsenobetaine, arsenocholine, arsenotriglutathione, or any of the inorganic arsenic-containing compounds, such as those enumerated above, which have been modified by inclusion of a hydrocarbon group.

Preferably, the non-metal compound is not a reduced sulfide (e.g., $Na_2S$, $K_2S$, $H_2S$, or $(NH_4)_2S$), reduced selenide (e.g., $H_2Se$ or $(NH_4)_2Se$), reduced telluride (e.g., $H_2Te$ or $(NH_4)_2Te$), or reduced arsenide compound. As known in the art, such reduced compounds have a propensity for precipitating various metals from solution. Since direct reaction of the non-metal compound and metal to form a precipitate is preferably avoided in the method described herein, a reduced non-metal compound is preferably used under conditions where an adverse reaction or precipitation does not occur.

One or more dopant species may or may not be included in the aqueous solution in order to dope the resulting particles. The dopant can be any metal or non-metal species, such as any of the metal and non-metal species described above. In some embodiments, the dopant may be or include one or more lanthanide elements, such as those selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Generally, the dopant is present in an amount of less than 0.5 molar percent of the resulting particles, or in different embodiments, less than or up to 0.4, 0.3, 0.2, 0.1, 0.05, 0.02, or 0.01 molar percent of the resulting particles. Some examples of doped compositions include ZnS:Ni, wherein Ni functions as a dopant, as described in, for example, Bang et al., *Advanced Materials*, 20:2599-2603 (2008), $Zn_xCd_{1-x}S$ doped compositions, as described in Wang et al., *Journal of Physical Chemistry C* 112:16754-16758 (2008), and ZnS:Mn and ZnS:Cu compositions, as described in Song et al., *Journal of Physics and Chemistry of Solids*, 69:153-160 (2008). In other embodiments, a dopant is excluded, or alternatively, one or more of any of the generic or specific dopants described above are excluded.

In particular embodiments, the electrochemical method described above is specifically directed to the preparation of particles having a CIGs-type composition. The method generally involves contacting an aqueous solution that includes Cu ions and at least one type of metal ion selected from In and Ga, along with a chalcogenide compound that includes at least one non-metal selected from S, Se, and Te, with an electrically powered cathode (i.e., at a negative electrode potential).

In other particular embodiments, the electrochemical method described above is specifically directed to the preparation of particles having a kesterite or thermoelectric composition. The method generally involves contacting an aqueous solution that includes at least one chalcophile metal and a source of either Sn or Sb metal species, along with a chalcogenide compound that includes at least one non-metal selected from S, Se, and Te, with an electrically powered cathode (i.e., at a negative electrode potential).

In yet other particular embodiments, the electrochemical method described above is specifically directed to the preparation of particles having a metal oxide composition. The method generally involves contacting an aqueous solution that includes at least one reducible metal oxide or hydroxide compound and water with an electrically powered cathode (i.e., negative voltage). The reducible metal oxide or hydroxide contains at least one metal capable of being reduced electrochemically reduced. The one or more reducible metals can be any of the metals of the Periodic Table of the Elements having this ability. Preferably, the one or more reducible metals are transition metals, i.e., Groups III-XII (scandium through zinc groups). More typically, the one or more reducible metals are first-row transition metals. Some examples of reducible first-row transition metal ions include Sc(III), Ti(IV), V(III), Cr(VI), Cr(III), Mn(VII), Mn(V), Mn(V), Mn(III), Fe(III), Co(III), Ni(III), and Cu(II). Significantly, in the electrochemical process, the metal oxide particles are not being chemically produced (e.g., by alkaline precipitation or decomposition), but rather, electrochemically produced.

In one embodiment, the reducible metal oxide component contains a single metal. The reducible metal oxide component can be, for example, an oxide, oxyhydroxide, or hydroxide of any one of the reducible metals described above. In another embodiment, the reducible metal oxide component contains more than one metal. For example, the reducible metal oxide component can be composed of two reducible metals (e.g., Fe(III) and Co(III), or Fe(III) and Cr(VI)), or three reducible metals (e.g., Fe(III), Co(III), and Cr(VI)), or a reducible metal and a non-reducible metal (e.g., Fe(III) and Zn(II), or Ti(IV) and or U(VI) and Fe(II), or Fe(II) and Fe(III)), or two or more reducible metals and a non-reducible metal, or a reducible metal and two or more non-reducible metals, or two or more reducible metals and two or more non-reducible metals. As used herein, the term "non-reducible metal" is a metal not capable of being reduced electrochemically from an aqueous solution, i.e., the reduction potential required for such reduction would be more negative than for the production of hydrogen from water. Some examples of non-reducible metals include the alkali metals (e.g., $Li^+$, $Na^+$, and $K^+$), alkaline earth metals (e.g., $Mg^{2+}$, $Ca^{2+}$, and $Sr^{2+}$), main group elements (e.g., cations of Group IIIA-VIIA of the Periodic Table, such as $B^{3+}$ and $Al^{3+}$), and lower oxidation state transition metals (e.g., $Ti^{2+}$, $V^{2+}$, $Cr^{2+}$, $Mn^{2+}$, $Fe^{2+}$, $Co^{2+}$, $Ni^{2+}$, and $Zn^{2+}$).

In a particular embodiment, the reducible metal oxide component includes one or more Fe(III)-containing compounds or materials. Some examples of Fe(III)-containing compounds or materials include the iron(III) halides (e.g., $FeCl_3$), nitrates, hydroxides, oxides, oxidehydroxides (also denoted herein as FeOOH, or Fe(O)OH), tungstates, titanates, chromates, vanadates, silicates, spinels (e.g., the ferrites), and perovskites. The Fe(III)-containing compound or material can also include a mixed-valence (e.g., Fe(II)-Fe(III)) portion. In particular, the Fe(III) oxidehydroxides can be any forms of these materials known in the art, e.g., goethite (□-FeOOH), akageneite (□-FeOOH), lepidocrocite (□-FeOOH), ferrihydrite ($Fe_5HO_8.4H_2O$ or $5Fe_2O_3.9H_2O$), Schwertmannite ($Fe_8O_8(OH)_6(SO_4).nH_2O$ or $Fe^{3+}_{16}O_{16}(OH,SO_4)_{12-13}.10-12H_2O$), or green rusts (e.g., $Fe^{III}_xFe^{II}_y(OH)_{3x+2y-z}(A^-)_z$; where $A^-$ is $Cl^-$ or $0.5SO_4^{2-}$), or a modified form or combination thereof. The Fe(III) oxides are typically accordingly to the general formula $Fe_2O_3$ (generally, hematite), and can be in any crystalline or amorphous phase thereof. Some examples of hematite phases include $\alpha$-$Fe_2O_3$ (hematite proper), $\beta$-$Fe_2O_3$, $\gamma$-$Fe_2O_3$ (maghemite), and $\in$-$Fe_2O_3$.

When one or more non-reducible metal species are included in the precursor composition, they typically become incorporated into the final metal oxide particle to some extent. Typically, the non-reducible metal species are included in the same weight or molar basis as provided in the aqueous composition.

In other embodiments, particles having a metal oxide composition are produced by contacting an aqueous solution that includes at least one non-reducible metal-containing compound or at least one reducible metal oxide or hydroxide compound and water with an electrically powered anode (i.e., positive voltage). The one or more reducible or non-reducible metals may be selected from, for example, Sc, Ti, V, Cr, Mn, Fe, Co, Ni, Cu, Zn, Y, Zr, Nb, Hf, Ta, Mo, W, Ag, Pd, Pt, Ga, In, Tl, Ge, Sn, Pb, Sb, and Bi. The positive potential used should be less than required (i.e., insufficient) for producing oxygen gas from water, and more typically, is sufficient to provide oxide species that complex with the non-reducible or reducible metal to form the metal. For example, an Fe(II) halide or sulfate composition dissolved in the aqueous solution may be converted to nano-objects having an Fe(II), Fe(III), or Fe(II)-Fe(III) oxide composition by contacting the aqueous solution to a suitably positive potential.

In other embodiments, particles having an elemental metal composition are produced by contacting an aqueous solution that includes at least one reducible metal (i.e., reducible metal salt) and water with an electrically powered cathode (i.e., negative voltage). The negative potential used should be less than required (i.e., insufficient) for producing hydrogen gas from water. The one or more reducible metals may be selected from, for example, Cu, Pd, Pt, Rh, Ir, Ag, Au, and combinations thereof. For example, an aqueous solution containing a cupric or cuprous halide or sulfate can be cathodically reduced to copper nanoparticles or nanowires by judicious selection of cathode potential, nano-textured cathode, pH, and temperature.

In some embodiments, the shape and other aspects of the morphology of the metal-containing nano-objects may be modified by careful selection of the pH of the aqueous solution during the electrochemical process. For example, under relatively similar or same conditions, a change to a more acidic pH (e.g., less than 7) may result in the formation of nanowires, whereas conducting the electrochemical process at more alkaline pH (e.g., above 7) may result in formation of nanoparticles of the same composition.

In other aspects, the invention is directed to a method for forming a component of a device that incorporates any of the above-described metal-containing particles. In particular embodiments, the particles are deposited onto a substrate (by, for example, spray-coating, dip-coating, spin-coating, drop-casting, or inkjet printing the substrate with a solution or suspension containing the metal-containing particles), the coated substrate is typically dried and annealed, and optionally overlaid with a sealant or functional overlayer. In some embodiments, an ink jet spraying process is used in which multiple ink-jet heads spray a multiplicity of different particle compositions. Ink jet spraying methods, particularly as used in producing patterned surfaces, are described in detail in, for example, U.S. Pat. Nos. 7,572,651, 6,506,438, 6,087,196, 6,080,606, 7,615,111, 7,655,161, and 7,445,731, the contents of which are incorporated herein by reference in their entirety. In other embodiments, an ultrasonic or sonospray coating process is used. The sonospray method is described in detail in, for example, U.S. Pat. Nos. 4,153,201, 4,337,896, 4,541,564, 4,978,067, 5,219,120, 7,712,680, as well as J. Kester, et al., CP394, *NREL/SNL PV Prog. Rev.*, pp. 162-169, AIP Press, NY, 1997, the contents of which are herein incorporated by reference in their entirety. The sonospray method is a non-vacuum deposition method amenable to the manufacture of large area films, along with low processing costs. In brief, the sonospray method employs an ultrasonic nozzle that operates by use of a piezoelectric transducer that produces a high frequency motion when subjected to a high frequency electrical signal. The high frequency vibration produced by the piezoelectric material travels down a horn of the nozzle. Liquid emerging from the surface of the horn is broken into a fine spray, which is highly controllable with respect to droplet size and distribution. The deposition temperature can be any suitable temperature, but particularly for temperature-sensitive substrates, such as plastics, the deposition temperature is preferably up to or less than 200, 180, 150, 120, 100, or 80° C.

In alternative embodiments, particles are deposited on an electrically conducting substrate by having the substrate attached to or itself function as the electrode on which particles are formed in the electrochemical process described above. In the latter embodiment, if the substrate functions as the electrode, at least a portion or all of the particles are preferably not dislodged (spalled off) from the electrode.

In some embodiments, a multi-layer (e.g., bilayer, trilayer, etc.) coating is provided on a substrate by, for example, depositing a first layer of metal-containing particles (with optional post-annealing, fixing, or sealing), and then depositing a subsequent coating of metal-containing particles of the same or different composition. The number of coatings may be two, three, or more successive coatings.

Moreover, the single layer or multilayer being deposited may be patterned by methods known in the art (e.g., by lithographic techniques) to produce a more sophisticated electronic or photonic device. In a first set of embodiments, a patterned structure is produced by producing an initial patterned layer of metal-containing particles, such as provided by a selective deposition process, such as ink-jet printing or sonospray techniques. A patterned multilayer structure may be produced by, for example, producing a patterned first layer, as above, and then depositing a second patterned layer of metal-containing particles. Successive (e.g., third, fourth, and higher numbers) of layers may be similarly deposited. Alternatively, a first deposited layer is not patterned, while a second deposited layer is patterned, and vice-versa.

The substrate can be useful for any applicable electronic or photonic device, such as a display, photovoltaic device (e.g., solar cell), electrode, sensor, optoelectronic device, phosphor, or electronic chip. In a first set of embodiments, the substrate is a metal substrate. Some examples of metal substrates include those composed exclusively of, or an alloy of copper, cobalt, nickel, zinc, palladium, platinum, gold, ruthenium, molybdenum, tantalum, rhodium, or stainless steel. In a second set of embodiments, the substrate is a semiconductor substrate. Some examples of semiconductor substrates include those composed exclusively of, or an alloy of silicon, germanium, indium, or tin, or an oxide, sulfide, selenide, telluride, nitride, phosphide, arsenide, or antimonide of any of these or other metals, such as of copper, zinc, or cadmium, including any of the metal oxide, metal chalcogenide, and metal pnictide compositions described above. In a third set of embodiments, the substrate is a dielectric substrate. Some general examples of dielectric substrates include ceramics, glasses, plastics, and polymers. The substrate may also have a combination of materials (e.g., metal and/or semiconductor components, along with a dielectric component). Some of these substrates, such as molybdenum-coated glass and flexible plastic or polymeric film, are particularly considered herein for use in photovoltaic applications. The photovoltaic substrate can be, for example, an absorber layer, emitter layer, or transmitter layer useful in a photovoltaic device. Other of these substrates can be used as dielectric or conductive layers in a semiconductor assembly device. Still other of these substrates (e.g., W, Ta, and TaN) may be useful as copper diffusion barrier layers, as particularly used in semiconductor manufacturing. The coating method described herein is particularly advantageous in that it can be practiced on a variety of heat-sensitive substrates (e.g., low-temperature plastic films) without damaging the substrate.

Examples have been set forth below for the purpose of illustration and to describe certain specific embodiments of the invention. However, the scope of this invention is not to be in any way limited by the examples set forth herein.

Example 1

Preparation of Graphene Electrode

Graphene nanopetals were grown at a temperature of approximately 800° C. in a direct-current plasma chemical vapor deposition (CVD) reactor. The graphene was grown on a silicon wafer either directly or on a nickel layer on top of the silicon wafer, using methane as a carbon source, with trace ammonia vapor present to assist in the reaction. The reaction took about 10 minutes. The wafer was then cooled, removed, and cleaved, before use. As shown in the micrograph in FIG. 1, the surface of the nanotextured electrode has graphene flakes disposed substantially vertically on the surface of the silicon underlayer.

Example 2

Electrochemical Preparation of CdS Particles and Nanowires

Figure 2:
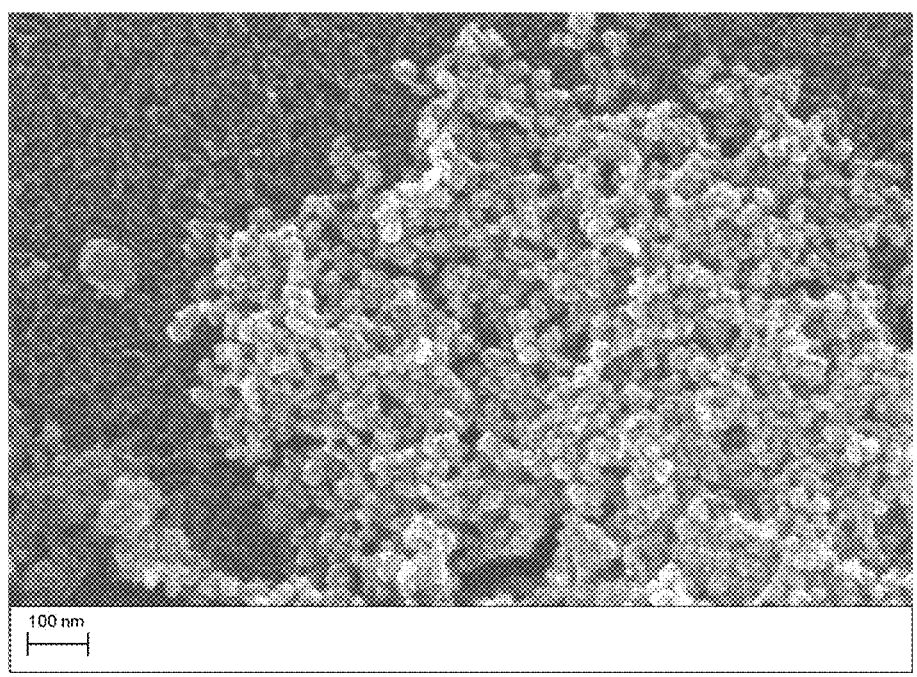
FIG. 2. A micrograph showing cadmium sulfide (CdS) nanoparticles produced by the electrochemical process described herein, from an aqueous solution containing $CdCl_2$ and a thiosulfate salt, under neutral to alkaline pH conditions.
Figure 3:
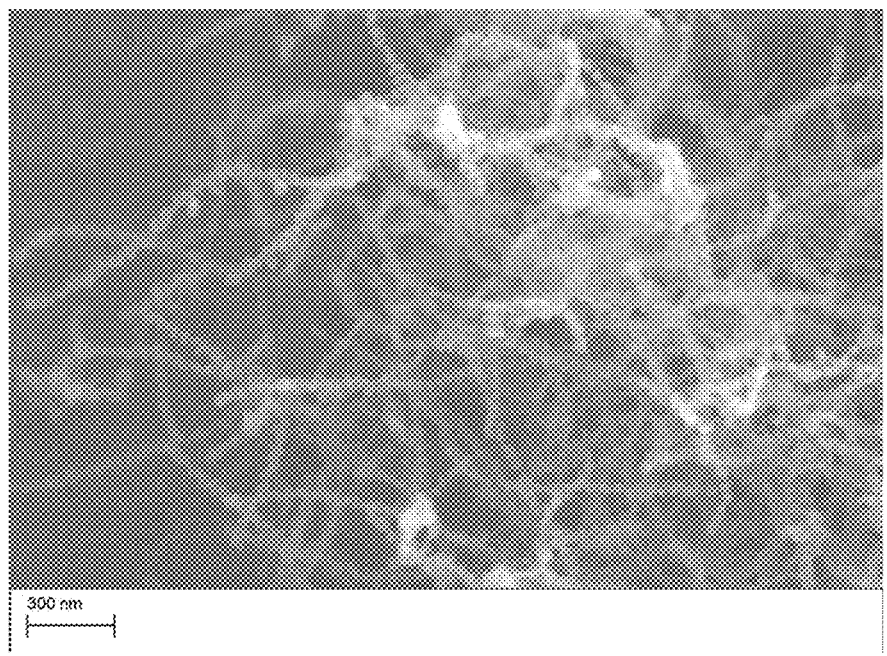
FIG. 3. A micrograph showing CdS nanowires produced by the electrochemical process described herein, from an aqueous solution containing $CdCl_2$ and a thiosulfate salt, under acidic pH conditions.

Cadmium chloride and sodium thiosulfate were dissolved in an acetate buffer containing 8 millimolar cadmium chloride, 8 millimolar sodium thiosulfate, and 340 millimolar sodium acetate with pH adjusted to 7. The carbon electrode (above) of about 2 cm² surface area was placed in the solution and run at −420 mV (standard hydrogen electrode potential) using platinum wire as a counter-electrode. A silver/silver chloride electrode was used as reference. The solution was sparged with nitrogen continuously and stirred. The acetate acts as both a buffer and a chelator to help control particle growth. This produced cadmium sulfide (CdS) nanoparticles of about 15 nm in diameter, which mostly ended up in solution, but with a minor amount remaining bound to the electrode. For the production of CdS nanowires, an identical procedure was performed, as above, except that the pH was adjusted to 3. In other experiments, cysteine and/or HEPES were used as chelators instead of or in combination with sodium acetate to make the nanoparticles or nanowires. FIG. 2 is a micrograph showing the CdS nanoparticles produced by the electrochemical process described above, from an aqueous solution containing $CdCl_2$ and a thiosulfate salt, under neutral to alkaline pH conditions. FIG. 3 is a micrograph showing CdS nanowires produced by the electrochemical process described above, from an aqueous solution containing $CdCl_2$ and a thiosulfate salt, under acidic pH conditions.

While there have been shown and described what are at present considered the preferred embodiments of the invention, those skilled in the art may make various changes and modifications which remain within the scope of the invention defined by the appended claims.

What is claimed is:

1. A method for producing metal-containing nano-objects, the method comprising contacting an aqueous solution comprising a metal salt and water with an electrically powered electrode to form said metal-containing nano-objects, wherein said electrode possesses a nanotextured surface having conductive nanoscopic projections pointed outwardly from the surface that function as nucleation sites and confine the particle growth process while permitting dislodging of said metal-containing nano-objects from the electrode.

2. The method of claim 1, wherein said conductive nanoscopic projections comprise flakes of graphene.

3. The method of claim 1, wherein said aqueous solution further comprises a surface-active agent that interacts by coordinate bonds to surfaces of the metal-containing nano-objects.

4. The method of claim 1, wherein said nano-objects are nanoparticles.

5. The method of claim 1, wherein said nano-objects are nanowires.

6. The method of claim 1, wherein said nano-objects have a metal chalcogenide composition selected from metal sulfide, metal selenide, metal telluride, and metal arsenide, and wherein said electrically powered electrode is an electrically powered cathode, the method comprising contacting an aqueous solution comprised of a metal salt, reducible chalcogen-containing substance, and water with said electrically powered cathode to form said metal chalcogenide nano-objects, wherein said cathode is powered at sufficient negative voltage to reduce said reducible chalcogen-containing substance to a chalcogenide species that complexes with the metal of said metal salt to form said metal chalcogenide nano-objects.

7. The method of claim 6, wherein said metal is selected from cationic forms of V, Cr, Mn, Fe, Co, Ni, Cu, Zn, Mo, W, Pd, Pt, Au, Ag, Cd, Hg, Ga, In, Tl, Ge, Sn, Pb, Sb, Bi, and combinations thereof.

8. The method of claim 6, wherein said metal is selected from cationic forms of Cd, Cu, Fe, Ga, In, Sn, and Zn.

9. The method of claim 6, wherein said reducible chalcogen-containing substance is a reducible sulfur-containing substance selected from sulfate, sulfite, elemental sulfur, thiosulfate, sulfur-containing amino acids, and sulfur-containing nucleobases.

10. The method of claim 6, wherein said reducible chalcogen-containing substance is a reducible selenium-containing substance selected from selenate, selenite, elemental selenium, selenosulfate, selenium-containing amino acids, and selenium-containing nucleobases.

11. The method of claim 6, wherein said reducible chalcogen-containing substance is a reducible tellurium-containing substance selected from tellurate, tellurite, elemental tellurium, tellurium-containing amino acids, and tellurium-containing nucleobases.

12. The method of claim 6, wherein said reducible chalcogen-containing substance is a reducible arsenic-containing substance selected from arsenate and arsenite compounds.

13. The method of claim 6, wherein said metal chalcogenide composition has the formula:

$$[(M'_x M''_{w-v})^{+r}]_s X^{-m}_z \qquad (1)$$

wherein each of M' and M" represents at least one metal cation, at least one of which is a transition metal cation, wherein M' and M" are the same or different; X represents S, Se, Te, N, P, As, Sb, or Bi, or a combination thereof, and the subscripts w, v, x, s, r, m, and z are integer or fractional numbers that together maintain charge balancing, wherein r x s=m x z, wherein "x" in the latter equation represents multiplication.

14. The method of claim 6, wherein said metal chalcogenide composition has the formula:

$$Cu(In_x Ga_{1-x})X_2 \qquad (2)$$

wherein x is an integral or non-integral numerical value of or greater than 0 and less than or equal to 1, and X is selected from S, Se, Te, and combinations thereof.

15. The method of claim 6, wherein said metal chalcogenide composition has the formula:

$$M_3SnX_4 \quad (4)$$

wherein M represents at least one chalcophile metal other than Sn, and X is selected from S, Se, Te, and combinations thereof.

16. The method of claim 15, wherein M is selected from Cu, Fe, Zn, Cd, and combinations thereof.

17. The method of claim 1, wherein said nano-objects have a metal oxide composition, and wherein said electrically powered electrode is an electrically powered cathode, the method comprising contacting an aqueous solution comprising a reducible metal oxide or hydroxide compound and water with said electrically powered cathode to form said metal oxide nano-objects.

18. The method of claim 17, wherein said metal oxide composition is selected from oxides of Sc, Ti, V, Cr, Mn, Fe, Co, Ni, Cu, Zn, Y, Zr, Nb, Hf, Ta, Mo, W, Ag, Pd, Pt, Ga, In, Tl, Ge, Sn, Pb, Sb, Bi, and combinations thereof.

19. The method of claim 17, wherein said reducible metal oxide or hydroxide compound is an oxide or hydroxide of a first row transition metal.

20. The method of claim 17, wherein said metal oxide nano-objects possess a spinel-type composition of the following formula:

$$M'_xM''_{3-x}O_4 \quad (11)$$

wherein M' and M'' are the same or different metal cations, at least one being a transition metal cation, and x is a numerical value of 0.01 to 1.5.

21. The method of claim 17, wherein the reducible metal component includes one or more Fe(III)-containing compounds or materials.

22. The method of claim 17, wherein the metal oxide nano-objects possess a spinel-type structure having the formula:

$$M'_yFe_{3-y}O_4$$

wherein M' is a metal cation and y is a numerical value of 0.01 to 2.

23. The method of claim 1, wherein said nano-objects have a metal oxide composition, and wherein said electrically powered electrode is an electrically powered anode, the method comprising contacting an aqueous solution comprising a metal salt and water with said electrically powered anode to form said metal oxide nano-objects, wherein said anode is powered at sufficient positive voltage to provide oxide species that complex with the metal of said metal salt to form said metal oxide nano-objects.

24. The method of claim 23, wherein said metal is selected from cationic forms of Sc, Ti, V, Cr, Mn, Fe, Co, Ni, Cu, Zn, Y, Zr, Nb, Hf, Ta, Mo, W, Ag, Pd, Pt, Ga, In, Tl, Ge, Sn, Pb, Sb, Bi, and combinations thereof.

25. The method of claim 1, wherein said nano-objects have an elemental metal composition, and wherein said electrically powered electrode is an electrically powered cathode, the method comprising contacting an aqueous solution comprising a reducible metal salt and water with said electrically powered cathode to form said elemental metal nano-objects, wherein said cathode is powered at sufficient negative voltage to reduce said reducible metal salt at a negative voltage insufficient to produce hydrogen from water, to form said elemental metal nano-objects.

26. The method of claim 25, wherein said metal is selected from Cu, Pd, Pt, Rh, Ir, Ag, Au, and combinations thereof.

27. The method of claim 1, wherein said aqueous solution is adjusted in pH to modify the shape of the metal-containing nano-objects.

28. The method of claim 1, wherein said nano-objects possess a size of less than 50 nm.

29. The method of claim 1, wherein said nano-objects possess a size of up to 20 nm.

30. The method of claim 1, wherein said nano-objects are dislodged from the electrode.

31. The method of claim 1, wherein said electrically powered electrode is, or is attached to, an electrically conductive functional substrate on which said metal-containing nano-objects are formed and remain attached.

* * * * *